United States Patent
Takahashi et al.

(10) Patent No.: US 8,814,405 B2
(45) Date of Patent: Aug. 26, 2014

(54) LIGHT EMITTING DEVICE, VEHICLE HEADLAMP, AND ILLUMINATION DEVICE

(75) Inventors: Koji Takahashi, Osaka (JP); Yoshiyuki Takahira, Osaka (JP); David Montgomery, Oxford (GB); James Suckling, Oxford (GB)

(73) Assignee: Sharp Kabushiki Kaisha, Osaka-shi (JP)

( * ) Notice: Subject to any disclaimer, the term of this patent is extended or adjusted under 35 U.S.C. 154(b) by 94 days.

(21) Appl. No.: 13/284,487

(22) Filed: Oct. 28, 2011

(65) Prior Publication Data

US 2012/0106189 A1    May 3, 2012

(30) Foreign Application Priority Data

Oct. 29, 2010 (JP) .................................. 2010-244570

(51) Int. Cl.
*B60Q 1/04* (2006.01)
*B60Q 1/00* (2006.01)

(52) U.S. Cl.
CPC ...................................... *B60Q 1/0035* (2013.01)
USPC .............................. 362/538; 362/231; 362/84

(58) Field of Classification Search
USPC ................. 362/84, 230, 231, 249.01, 249.02, 362/249.11, 259, 276, 308, 311.01, 311.02, 362/327, 328, 347, 475, 507, 509, 510, 514, 362/517, 520, 538, 539, 545–546, 800, 802
See application file for complete search history.

(56) References Cited

U.S. PATENT DOCUMENTS

| | | | |
|---|---|---|---|
| 5,535,230 A | 7/1996 | Abe | |
| 6,412,971 B1 | 7/2002 | Wojnarowski et al. | |
| 7,084,435 B2 | 8/2006 | Sugimoto et al. | |
| 7,131,759 B2 | 11/2006 | Ishida et al. | |
| 7,144,131 B2 | 12/2006 | Rains | |
| 7,165,871 B2 * | 1/2007 | Takeda et al. | 362/538 |
| 7,168,837 B2 * | 1/2007 | Ishida et al. | 362/539 |
| 7,232,247 B2 | 6/2007 | Yatsuda et al. | |
| 7,282,748 B2 * | 10/2007 | Takeda et al. | 257/98 |

(Continued)

FOREIGN PATENT DOCUMENTS

| | | |
|---|---|---|
| CN | 1676986 | 10/2005 |
| CN | 101629689 | 1/2010 |

(Continued)

OTHER PUBLICATIONS

Takahashi, K. et al. "'Laser Headlight' for Next Generation Automotive Lighting." Proceedings for the 9th International Symposium on Automotive Lighting. Darmstadt, Germany. Sep. 26-28, 2011. pp. 271-283 with cover page.

(Continued)

*Primary Examiner* — Hargobind S Sawhney

(74) *Attorney, Agent, or Firm* — Morrison & Foerster LLP

(57) ABSTRACT

A headlamp of one embodiment of this invention includes a laser element for emitting a laser beam, a light emitting section for generating fluorescence upon receiving the laser beam, and a reflecting mirror for projecting the fluorescence. Distribution of the fluorescence emitted by the light emitting section corresponds to Lambertian distribution, and an incident angle of the laser beam with respect to an excitation light irradiated surface, which is a surface of the light emitting section irradiated with the laser beam, is set so that use efficiency of the fluorescence emitted by the light emitting section is increased.

14 Claims, 18 Drawing Sheets

(56) References Cited

U.S. PATENT DOCUMENTS

| | | | |
|---|---|---|---|
| 7,382,091 B2* | 6/2008 | Chen et al. | 313/512 |
| 7,388,232 B2 | 6/2008 | Suehiro et al. | |
| 7,810,954 B2 | 10/2010 | Kolodin | |
| 8,342,720 B2* | 1/2013 | Harada et al. | 362/311.06 |
| 8,348,458 B2* | 1/2013 | Holten et al. | 362/231 |
| 2001/0028565 A1 | 10/2001 | Ishida | |
| 2002/0015308 A1 | 2/2002 | Naganawa et al. | |
| 2004/0120155 A1 | 6/2004 | Suenaga | |
| 2004/0184279 A1 | 9/2004 | Molto et al. | |
| 2005/0105301 A1 | 5/2005 | Takeda et al. | |
| 2005/0157508 A1* | 7/2005 | Takeda et al. | 362/459 |
| 2005/0231971 A1 | 10/2005 | Ishida | |
| 2006/0139926 A1 | 6/2006 | Morioka et al. | |
| 2007/0080362 A1 | 4/2007 | Scotch et al. | |
| 2008/0007961 A1 | 1/2008 | Mochizuki et al. | |
| 2009/0046474 A1 | 2/2009 | Sato et al. | |
| 2009/0231874 A1* | 9/2009 | Kishimoto et al. | 362/538 |
| 2009/0273918 A1 | 11/2009 | Falicoff et al. | |
| 2010/0008099 A1 | 1/2010 | Inoue et al. | |
| 2010/0102199 A1* | 4/2010 | Negley et al. | 250/201.1 |
| 2010/0128463 A1 | 5/2010 | Kim et al. | |
| 2010/0232173 A1 | 9/2010 | Ohno et al. | |
| 2011/0085343 A1 | 4/2011 | Ohno et al. | |
| 2011/0215701 A1 | 9/2011 | Tong et al. | |
| 2011/0248624 A1 | 10/2011 | Kishimoto et al. | |
| 2011/0280031 A1 | 11/2011 | Luger et al. | |
| 2012/0068630 A1 | 3/2012 | Li et al. | |
| 2012/0104934 A1 | 5/2012 | Fukai et al. | |
| 2012/0106183 A1 | 5/2012 | Takahashi | |
| 2012/0106188 A1 | 5/2012 | Takahashi et al. | |
| 2012/0140504 A1 | 6/2012 | Fukai et al. | |
| 2012/0163009 A1 | 6/2012 | Nakazato et al. | |
| 2012/0224384 A1 | 9/2012 | Takahira et al. | |
| 2013/0003403 A1 | 1/2013 | Takahira et al. | |

FOREIGN PATENT DOCUMENTS

| | | |
|---|---|---|
| JP | 7-282609 | 10/1995 |
| JP | 7-318998 | 12/1995 |
| JP | 2002-87153 | 3/2002 |
| JP | 2003-295319 | 10/2003 |
| JP | 2004-231179 | 8/2004 |
| JP | 2004-241142 | 8/2004 |
| JP | 2005-150041 | 6/2005 |
| JP | 2005-205195 | 8/2005 |
| JP | 2006-210887 | 8/2006 |
| JP | 2006-253019 | 9/2006 |
| JP | 2007-30570 | 2/2007 |
| JP | 2007-142173 | 6/2007 |
| JP | 2008-13014 | 1/2008 |
| JP | 2009-9898 | 1/2009 |
| JP | 2009-48786 | 3/2009 |
| JP | 2009-513003 | 3/2009 |
| JP | 2009-67083 | 4/2009 |
| JP | 2009-96250 | 5/2009 |
| JP | 2009-129683 | 6/2009 |
| JP | 2009-266437 | 11/2009 |
| JP | 2009-302186 | 12/2009 |
| JP | 2010-86815 | 4/2010 |
| JP | 2010-140663 | 6/2010 |
| JP | 2010-153241 | 7/2010 |
| JP | 2010-198805 | 9/2010 |
| JP | 2010-212148 | 9/2010 |
| JP | 2010-212615 | 9/2010 |
| JP | 2010-232044 | 10/2010 |
| JP | 2011-21062 | 2/2011 |
| WO | WO-2010/116305 | 10/2010 |

OTHER PUBLICATIONS

Takahashi et al., U.S. Office Action mailed Aug. 8, 2013, directed to U.S. Appl. No. 13/284,523; 17 pages.

Takahashi et al., U.S. Notice of Allowance mailed Jan. 27, 2014, directed to U.S. Appl. No. 13/284,523; 8 pages.

Fukai et al., U.S. Office Action mailed Feb. 10, 2014, directed to U.S. Appl. No. 13/297,008; 12 pages.

Takahashi, U.S. Notice of Allowance mailed Feb. 21, 2014, directed to U.S. Appl. No. 13/280,572; 10 pages.

Fukai et al., U.S. Office Action mailed May 23, 2014, directed to U.S. Appl. No. 13/297,008; 18 pages.

Takahira et al., U.S. Office Action mailed Jun. 13, 2014, directed to U.S. Appl. No. 13/407,366; 15 pages.

Takahira et al., U.S. Office Action mailed Jul. 1, 2014, directed to U.S. Appl. No. 13/533,550; 7 pages.

* cited by examiner

FIG. 3 (a) TOP VIEW
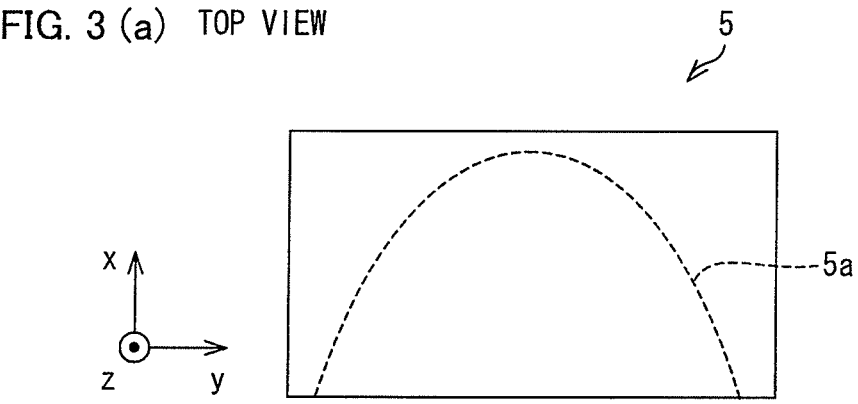
FIG. 3 (b) FRONT VIEW
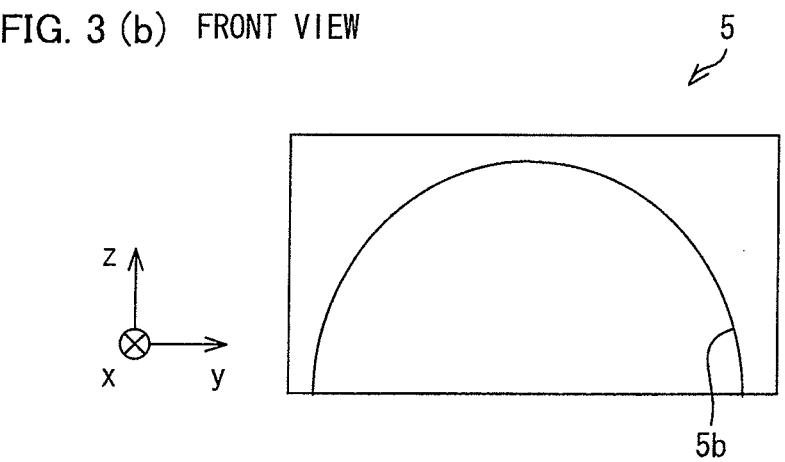
FIG. 3 (c) SIDE VIEW
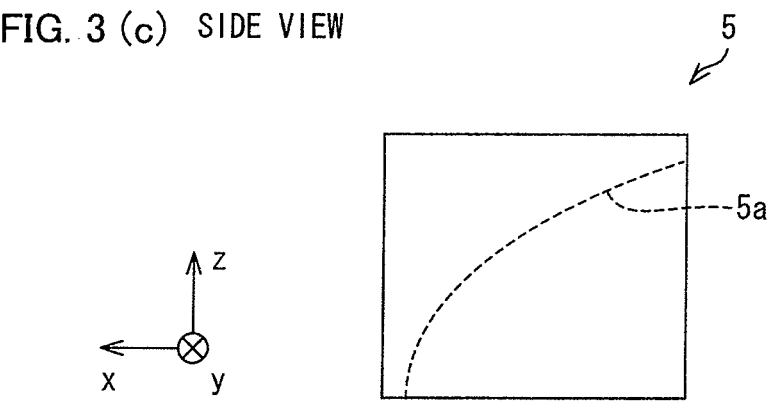

| ANGLE RANGE | % |
|---|---|
| −10〜10 | 18 |
| −20〜20 | 35 |
| −30〜30 | 51 |
| −45〜45 | 71 |
| −60〜60 | 87 |
| −70〜70 | 94 |
| −80〜80 | 99 |
| −90〜90 | 100 |

COOLANT WATER "IN"
COOLANT WATER "OUT"

LIGHT EMITTING DEVICE, VEHICLE HEADLAMP, AND ILLUMINATION DEVICE

This Nonprovisional application claims priority under 35 U.S.C. §119(a) on Patent Application No. 2010-244570 filed in Japan on Oct. 29, 2010, the entire contents of which are hereby incorporated by reference.

TECHNICAL FIELD

The present invention relates to (i) a light emitting device which emits, as illumination light, fluorescence that a fluorescent material generates upon receiving excitation light, (ii) a vehicle headlamp (headlight) including the light emitting device, and (iii) an illumination device including the light emitting device.

BACKGROUND ART

In recent years, a lot of research has been done for a light emitting device which emits, as illumination light, fluorescence that a light emitting section including a fluorescent material generates in response to excitation light emitted onto the light emitting section by an excitation light source such as a semiconductor light emitting element, e.g., a light emitting diode (LED) or a semiconductor laser (LD: Laser Diode).

Examples of such a light emitting device encompass a vehicle headlamp disclosed in Patent Literature 1. The vehicle headlamp includes an LED module or an LD module as an excitation light source, and generates white light by emitting excitation light onto a fluorescent material formed into small dots each having a diameter of approximately 0.5 mm or less. The white light thus generated is reflected forward by a reflector having an elliptic spherical surface or a paraboloidal surface, so that the white light is incident on a projector lens.

Patent Literature 2 discloses a light source device including (i) a laser diode and (ii) a collimator, a condenser, and a fluorescent material each of which is provided ahead of the laser diode. A laser beam, which is coherent light, is transmitted through the collimator and the condenser, so that the condensed laser beam is incident on the fluorescent material. Consequently, the fluorescent material emits incoherent light.

Patent Literature 3 discloses that, in a case where an optical fiber cannot be provided at the vertex of a concave mirror, the optical fiber may be provided at a slant with respect to a center line extending from a focal point of the concave mirror to the vertex of the concave mirror.

CITATION LIST

Patent Literature

Patent Literature 1
Japanese Patent Application Publication, Tokukai, No. 2004-241142 A (Publication Date: Aug. 26, 2004)
Patent Literature 2
Japanese Patent Application Publication, Tokukai, No. 2003-295319 A (Publication Date: Oct. 15, 2003)
Patent Literature 3
Japanese Patent Application Publication, Tokukaihei, No. 7-318998 A (Publication Date: Dec. 8, 1995)

SUMMARY OF INVENTION

Technical Problem

From a viewpoint of energy saving and extension of a light-emitting duration of a light emitting device which emits light by use of a battery, it is important to reduce electric power consumption of the light emitting device. Considered as one of measures to reduce the electric power consumption of the light emitting device is to increase use efficiency of fluorescence generated by the light emitting section.

However, none of Patent Literatures 1 through 3 discloses or suggests a configuration for increasing the use efficiency. For example, Patent Literature 3 neither discloses nor suggests at which angle a laser beam should be emitted for the purpose of increasing the use efficiency of the florescence. In particular, Patent Literature 3 does not mention a shape of the light emitting section, and does not describe how the shape of the light emitting section should be designed and how an incident angle of the laser beam should be set for the purpose of increasing the use efficiency of the fluorescence.

An object of the present invention is to provide (i) a light emitting device which is capable of increasing use efficiency of fluorescence, (ii) a vehicle headlamp including the light emitting device, and (iii) an illumination device including the light emitting device.

Solution to Problem

In order to attain the foregoing object, a light emitting device in accordance with an embodiment of the present invention includes: an excitation light source for emitting excitation light; a light emitting section for emitting fluorescence upon receiving the excitation light emitted from the excitation light source; and a light projecting section for projecting the fluorescence emitted by the light emitting section, distribution of the fluorescence emitted from the light emitting section corresponding to Lambertian distribution, and an incident angle of the excitation light with respect to an excitation light irradiated surface, onto which the excitation light is emitted, of the light emitting section being set so that use efficiency of the fluorescence emitted from the light emitting section is increased.

According to the above configuration, the light emitting section generates fluorescence upon receiving excitation light emitted from the excitation light source, and the light projecting section projects the fluorescence, so that the fluorescence is emitted as illumination light.

Typically, most of the fluorescence from the light emitting section is emitted within a predetermined angle range. Therefore, if an opening section through which the excitation light is transmitted is provided in a part of the light projecting section which part is within this angle range, there occurs a loss in the fluorescence because the fluorescence cannot be projected by the opening section. Furthermore, if the excitation light source is provided within the predetermined angle range, there occurs a loss in the fluorescence because the fluorescence is absorbed or dispersed by the excitation light source.

In order to address these problems, according to the above configuration, the incident angle of the excitation light is set so that use efficiency of the fluorescence emitted by the light emitting section is increased (i.e., the loss in the fluorescence is reduced). This makes it possible to provide a light emitting device having high use efficiency of fluorescence.

In order to attain the foregoing object, a light emitting device in accordance with an embodiment of the present invention includes: an excitation light source for emitting excitation light; a light emitting section for emitting fluorescence upon receiving the excitation light emitted from the excitation light source; and a light projecting section for projecting the fluorescence emitted by the light emitting section, a part of the light projecting section being provided above an excitation light irradiated surface of the light emitting section, the excitation light irradiated surface being an upper surface of the light emitting section, which upper surface has a larger area than that of a side surface of the light emitting section, the light emitting section having a small thickness, or a spot of the excitation light incident on the excitation light irradiated surface having a smaller area than an area of the excitation light irradiated surface, and an incident angle of the excitation light with respect to the excitation light irradiated surface being set so that use efficiency of the fluorescence emitted from the light emitting section is increased.

According to the above configuration, the light emitting section generates fluorescence upon receiving excitation light emitted from the excitation light source, and the light projecting section projects the fluorescence, so that the fluorescence is emitted as illumination light.

Here, because the upper surface of the light emitting section faces the light projecting section, it is possible to increase a percentage of fluorescence whose traveling path is controllable, with respect to the fluorescence emitted from the light emitting section.

Even with this configuration, it is highly possible that (i) fluorescence emitted from the side surface of the fluorescent material (laterally-emitted fluorescence) cannot be controlled and (ii) such fluorescence might be emitted in a direction other than a front direction.

However, since the light emitting section has a small thickness or a spot of the excitation light has a smaller area than an area of the surface of the light emitting section which surface receives the excitation light, an amount of the laterally-emitted fluorescence is reduced. This has been confirmed by the inventors of the present invention. Therefore, with the above configuration, it is possible to reduce an amount of fluorescence that cannot be controlled by the light projecting section, thereby increasing use efficiency of fluorescence.

According to the above-described light emitting section, most of the fluorescence is emitted within a predetermined angle range. Therefore, if an opening section which transmits the excitation light is provided in a part of the light projecting section which part is within this angle range, there occurs a loss in the fluorescence because the fluorescence cannot be projected by the opening section. Furthermore, if the excitation light source is provided within the predetermined angle range, there occurs a loss in the fluorescence because the fluorescence is absorbed or dispersed by the excitation light source.

In order to address these problems, according to the above configuration, the incident angle of the excitation light is set so that use efficiency of the fluorescence emitted by the light emitting section is increased (i.e., the loss in the fluorescence is reduced). This makes it possible to provide a light emitting device having high use efficiency of fluorescence.

Note that the description that "the light emitting section has a small thickness" herein means a shape of such a light emitting section that a side surface has a sufficiently smaller area than that of an upper surface and therefore most of the fluorescence is emitted upwardly.

As described above, a light emitting device in accordance with an embodiment of the present invention includes: an excitation light source for emitting excitation light; a light emitting section for emitting fluorescence upon receiving the excitation light emitted from the excitation light source; and a light projecting section for projecting the fluorescence emitted by the light emitting section, distribution of the fluorescence emitted from the light emitting section corresponding to Lambertian distribution, and an incident angle of the excitation light with respect to an excitation light irradiated surface, onto which the excitation light is emitted, of the light emitting section being set so that use efficiency of the fluorescence emitted from the light emitting section is increased.

Further, a light emitting device in accordance with an embodiment of the present invention includes: an excitation light source for emitting excitation light; a light emitting section for emitting fluorescence upon receiving the excitation light emitted from the excitation light source; and a light projecting section for projecting the fluorescence emitted by the light emitting section, a part of the light projecting section being provided above an excitation light irradiated surface of the light emitting section, the excitation light irradiated surface being an upper surface of the light emitting section, which upper surface has a larger area than that of a side surface of the light emitting section, the light emitting section having a small thickness, or a spot of the excitation light incident on the excitation light irradiated surface having a smaller area than an area of the excitation light irradiated surface, and an incident angle of the excitation light with respect to the excitation light irradiated surface being set so that use efficiency of the fluorescence emitted from the light emitting section is increased.

Therefore, the present invention brings about an effect of increasing use efficiency of fluorescence.

BRIEF DESCRIPTION OF DRAWINGS

FIG. 3($a$) is a top view of the parabolic mirror. FIG. 3($b$) is a front view of the parabolic mirror. FIG. 3($c$) is a side view of the parabolic mirror.

FIG. 5($b$) is a graph overlapping the graph of FIG. 5($a$) and showing an optical emission property of a light emitting section having a large thickness.

Figure 8:
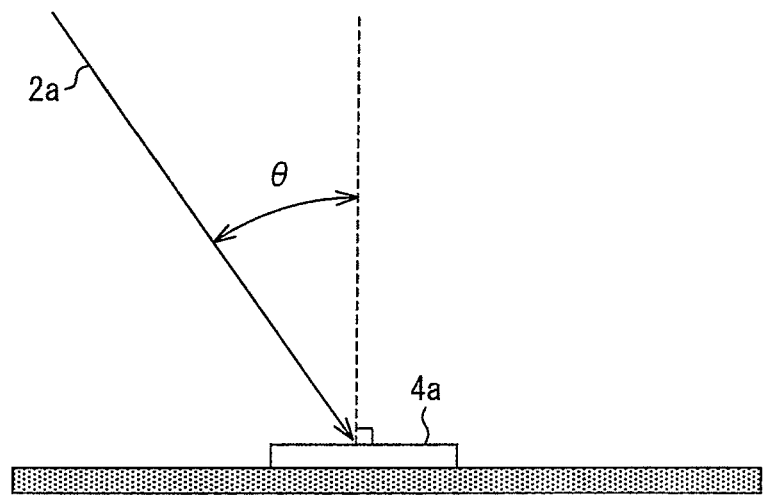
Figure 8:
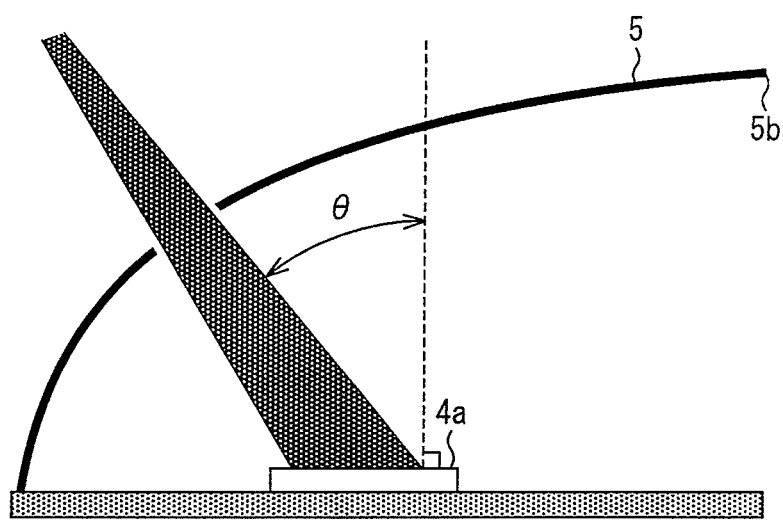

Each of FIG. 8($a$) and FIG. 8($b$) is an explanatory view illustrating an incident angle of a laser beam with respect to the upper surface of the light emitting section.

Figure 9:
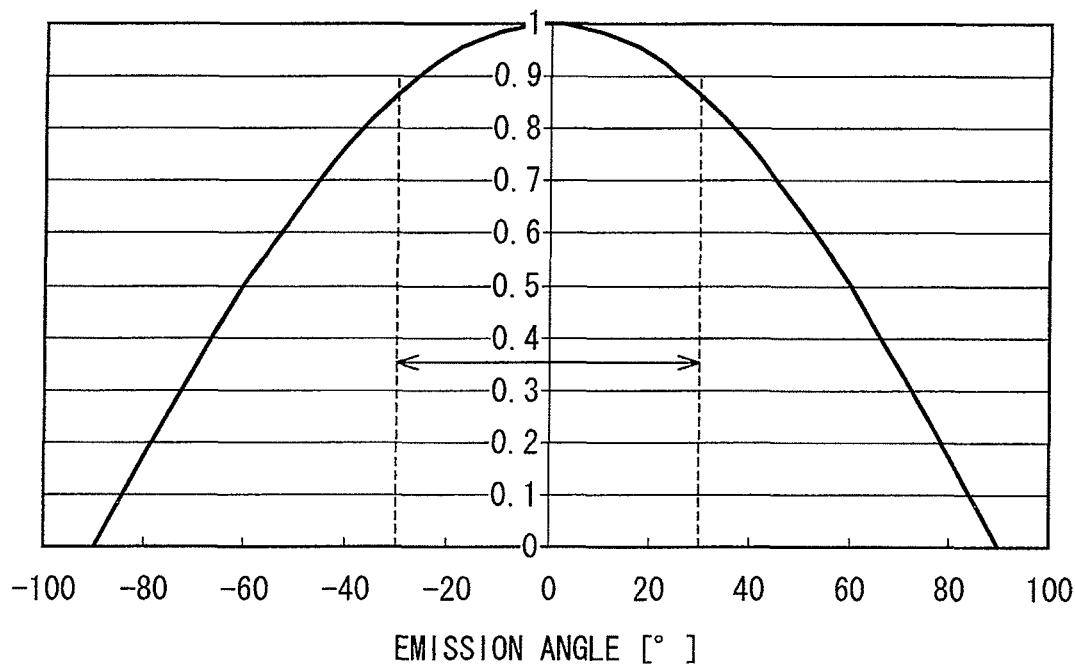

FIG. 9($a$) is a graph illustrating dispersion of fluorescence. FIG. 9($b$) is a view showing a percentage of an integrated value of fluorescence with respect to a total amount of fluorescence, which percentage is observed in each angle range.

Figure 10:
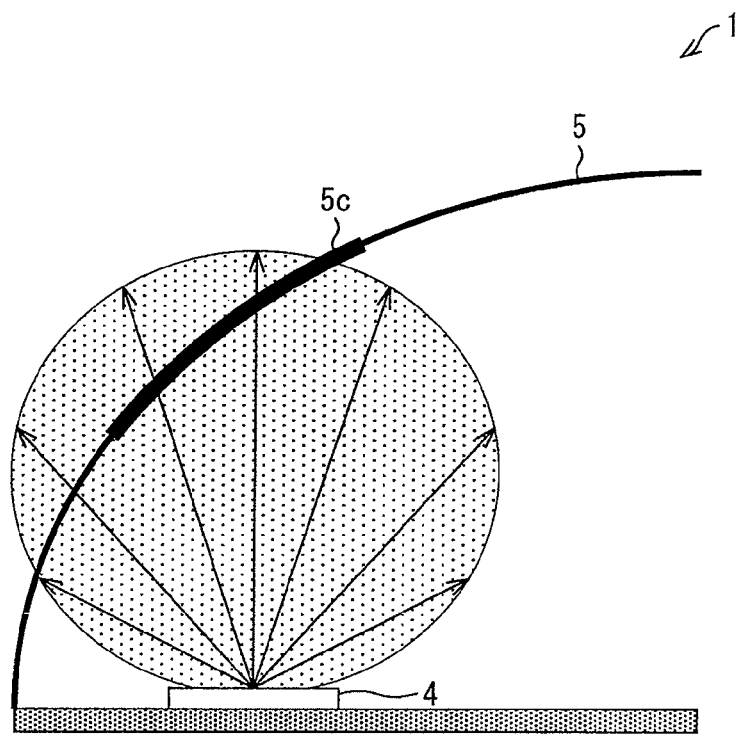

FIG. 10 is a view illustrating a positional relationship between (i) an emission range of a laser beam and (ii) the parabolic mirror.

Figure 11:
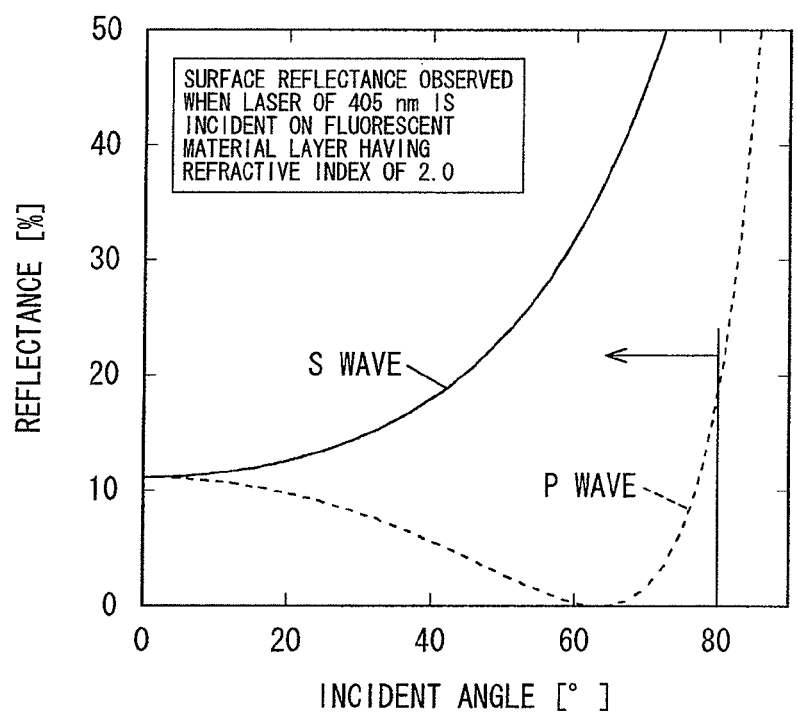

FIG. 11 is a graph showing changes in respective reflectances of an S-polarized laser beam and a P-polarized laser beam which changes are caused by changes in their incident angles.

Figure 12:
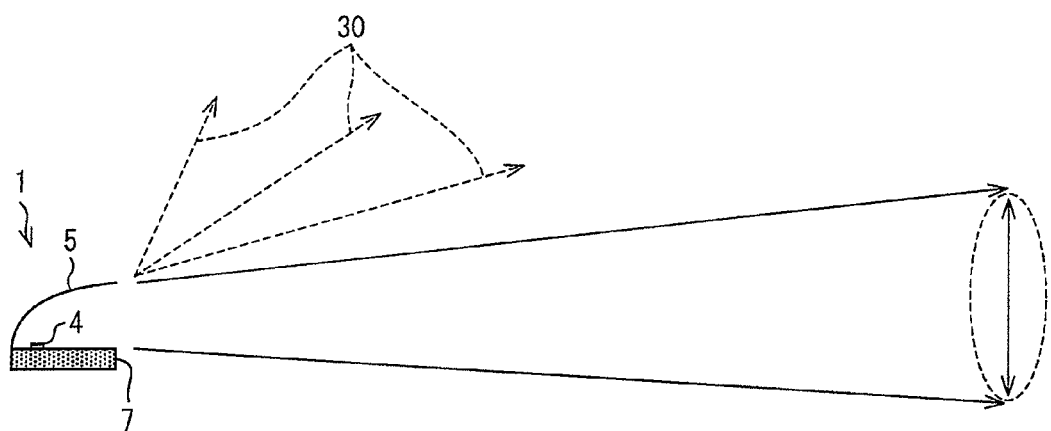

FIG. 12 is a view conceptually illustrating a light projection property of the parabolic mirror.

Figure 13:
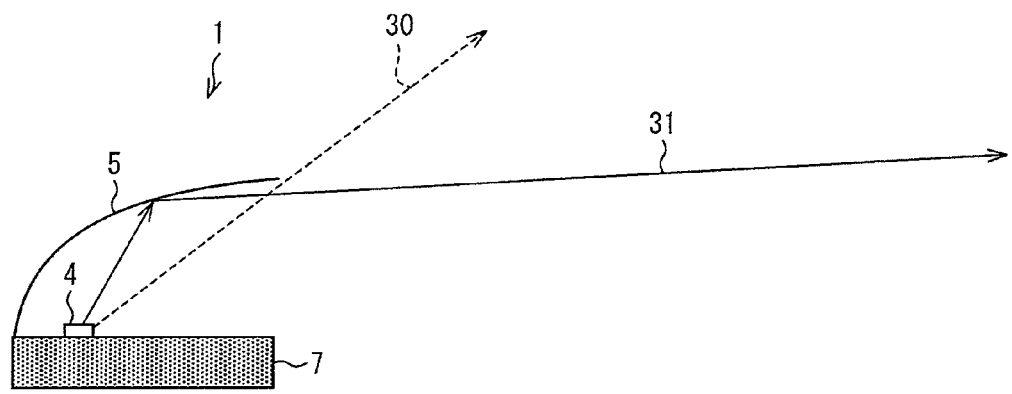

FIG. 13 is an explanatory view for illustrating a principle of the light projection property of the parabolic mirror.

Figure 14:
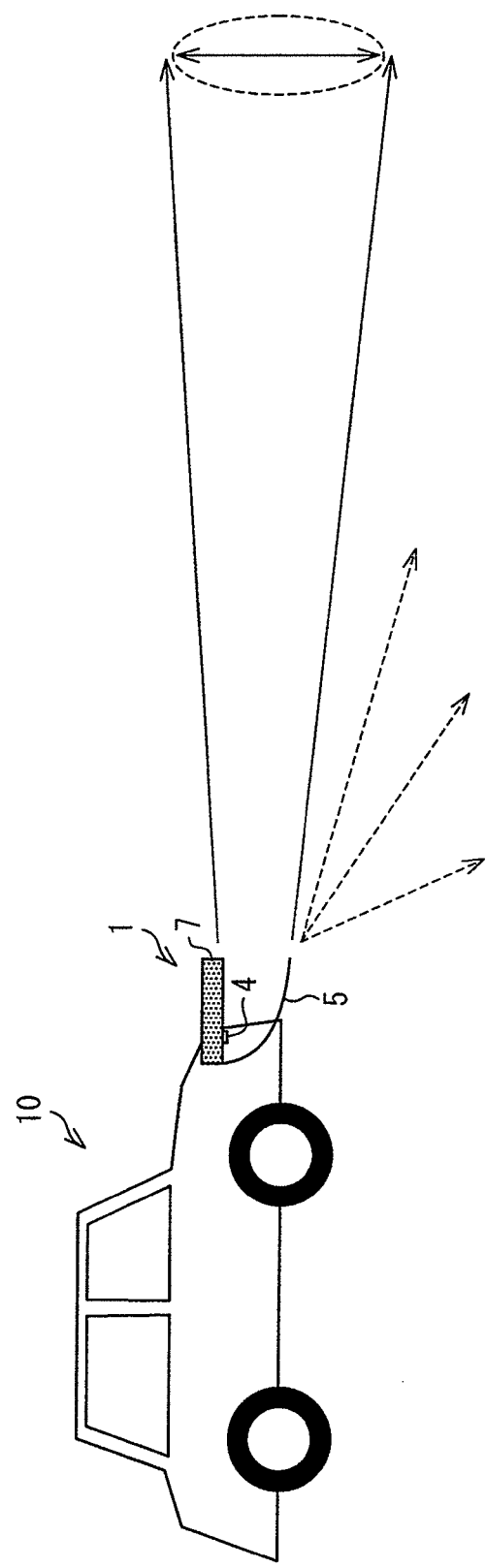

FIG. 14 is a view conceptually illustrating an orientation of a headlamp mounted in an automobile.

Figure 15:
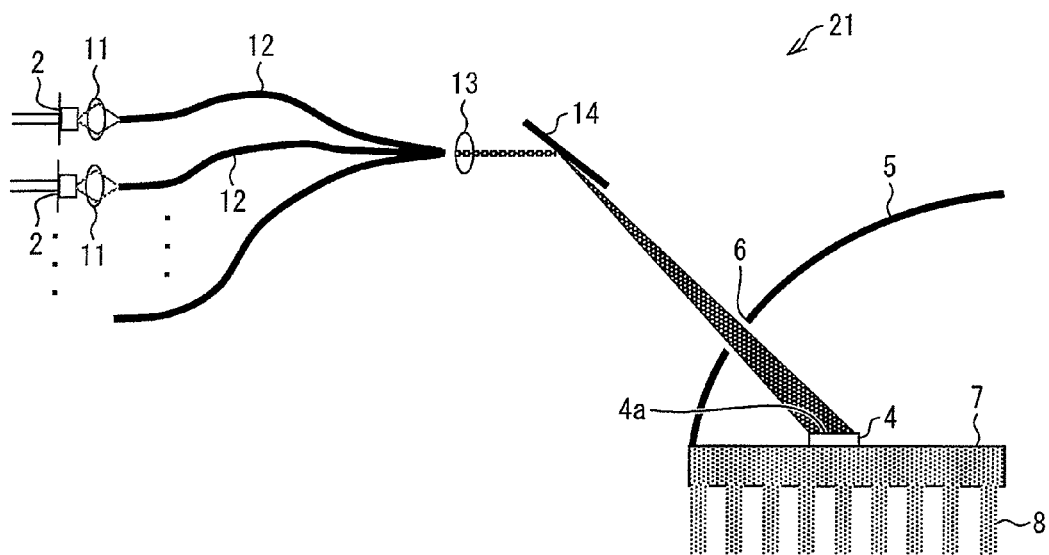

FIG. 15 is a view schematically illustrating a headlamp in accordance with one example of the present invention.

Figure 16:
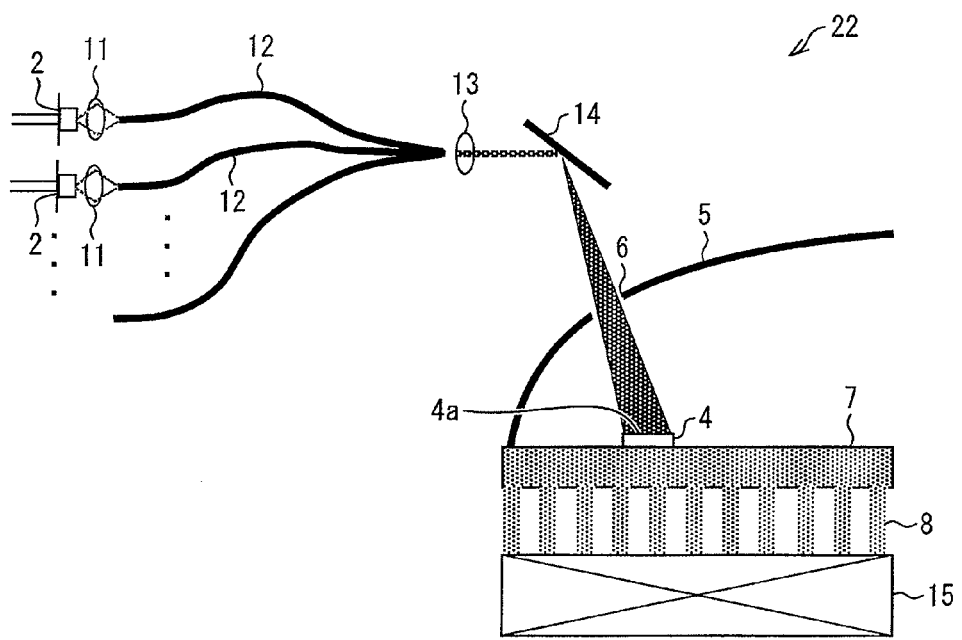

FIG. 16 is a view schematically illustrating a headlamp in accordance with another example of the present invention.

Figure 17:
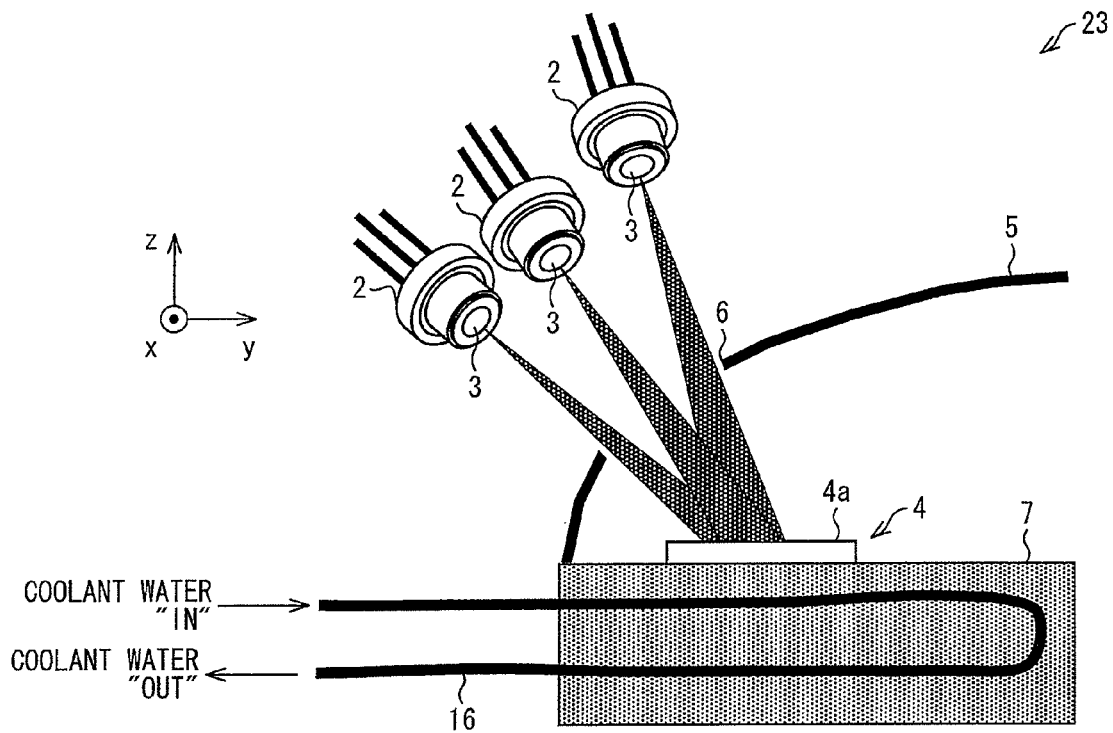

FIG. 17 is a view schematically illustrating a headlamp in accordance with further another example of the present invention.

Figure 18:
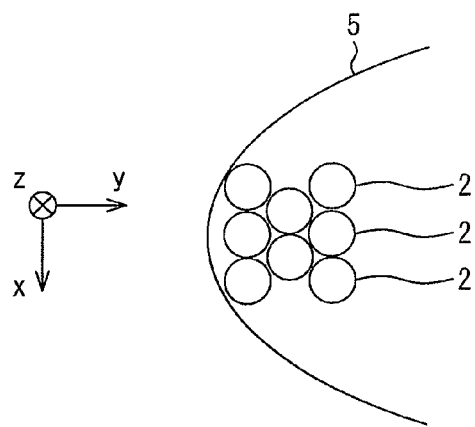

FIG. 18 is a top view illustrating an arrangement of a plurality of laser elements.

Figure 19:
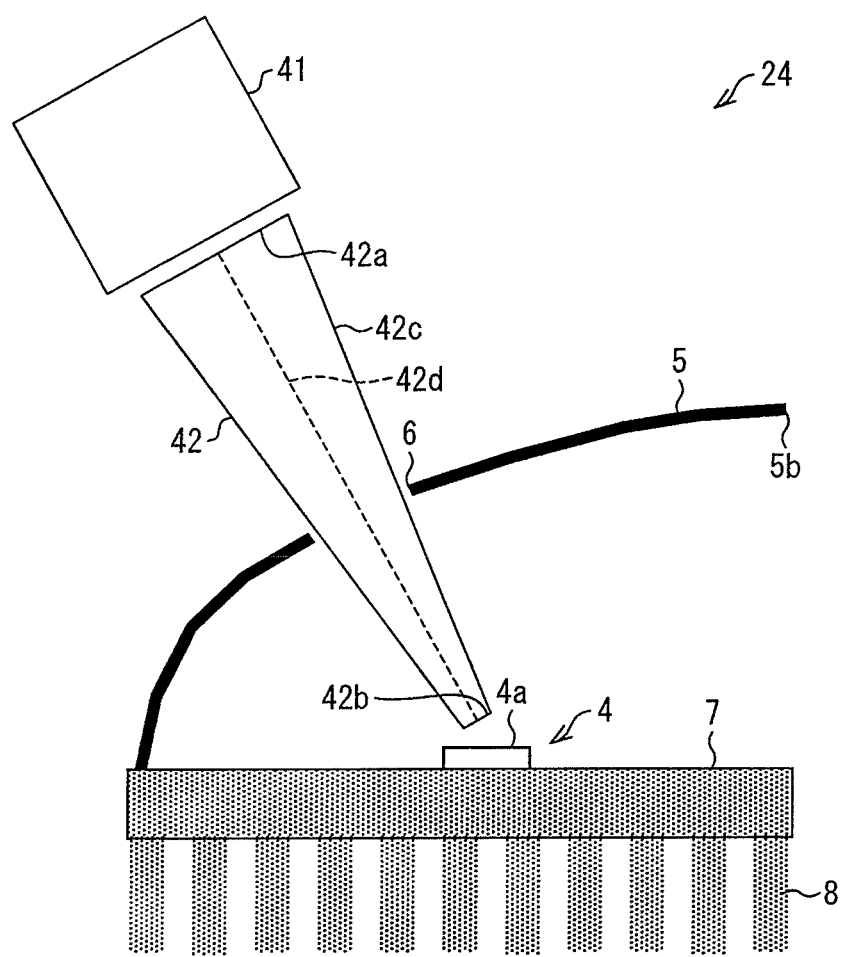

FIG. 19 is a view schematically illustrating a headlamp in accordance with still another example of the present invention.

Figure 20:
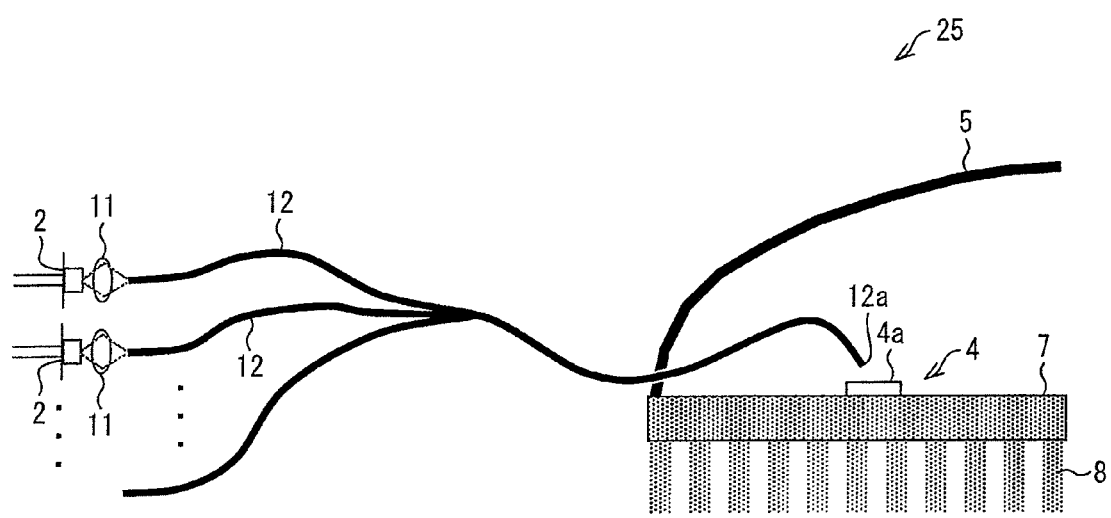

FIG. 20 is a view schematically illustrating a headlamp in accordance with yet another example of the present invention.

Figure 21:
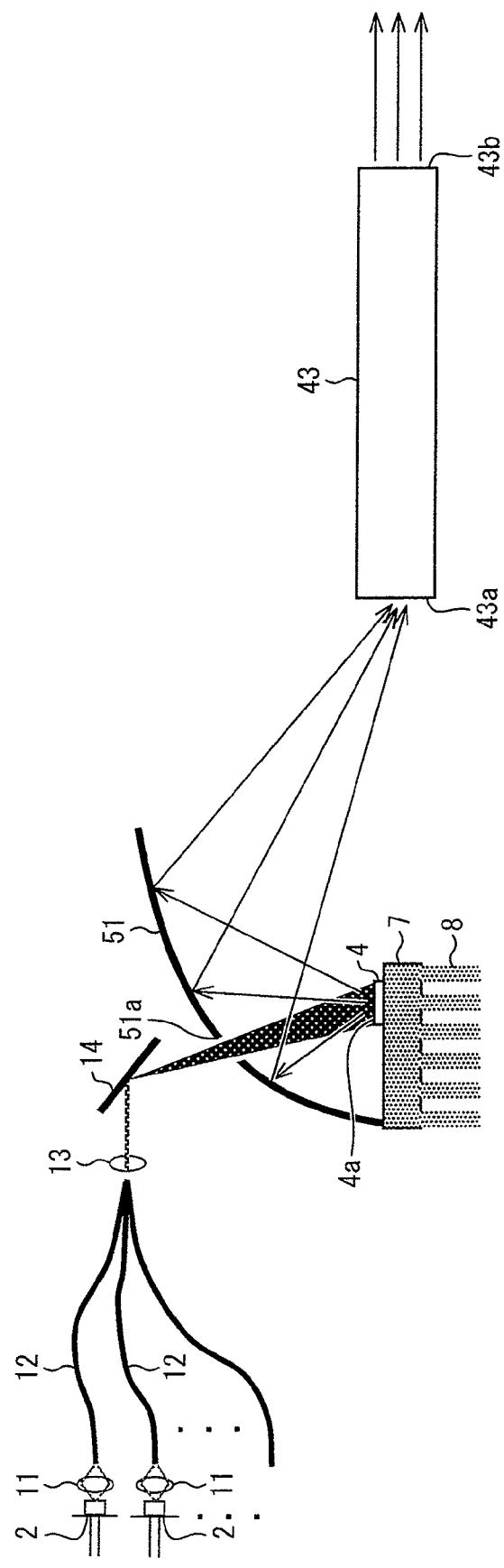

FIG. 21 is a view schematically illustrating an illumination device in accordance with still yet another example of the present invention.

Figure 22:
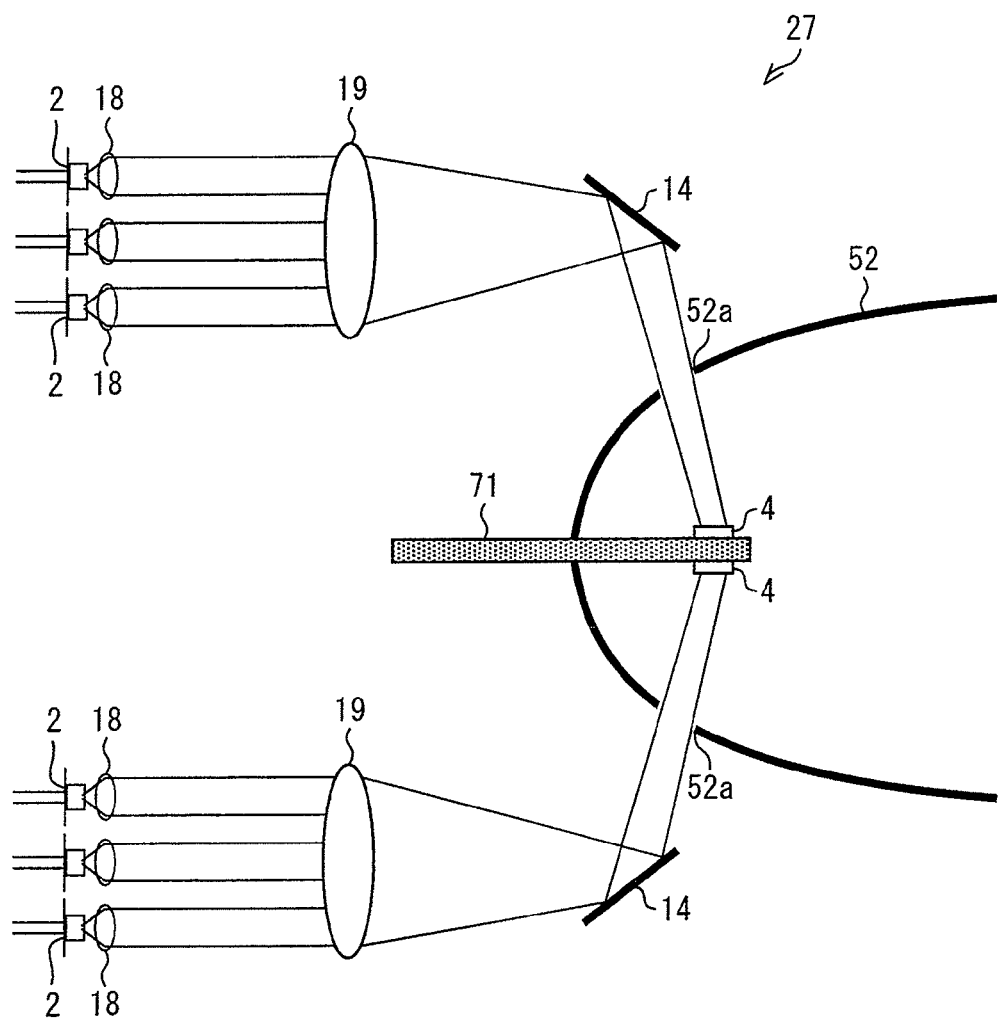

FIG. 22 is a view schematically illustrating a variation of the present invention.

Figure 23:
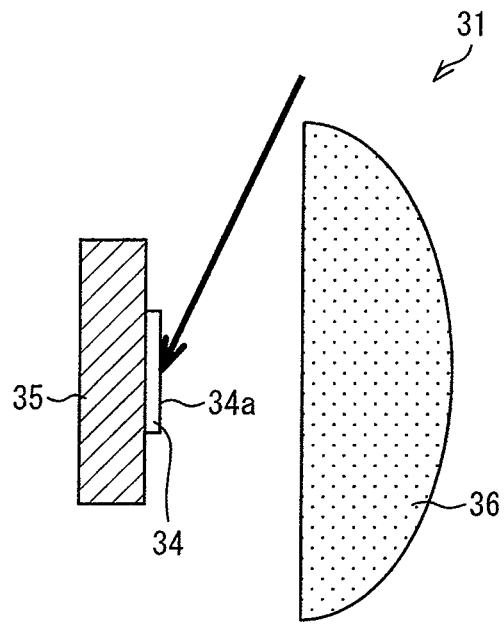

FIG. 23 is a view schematically illustrating a configuration of a headlamp including a projector lens as a light projecting section.

Figure 24:
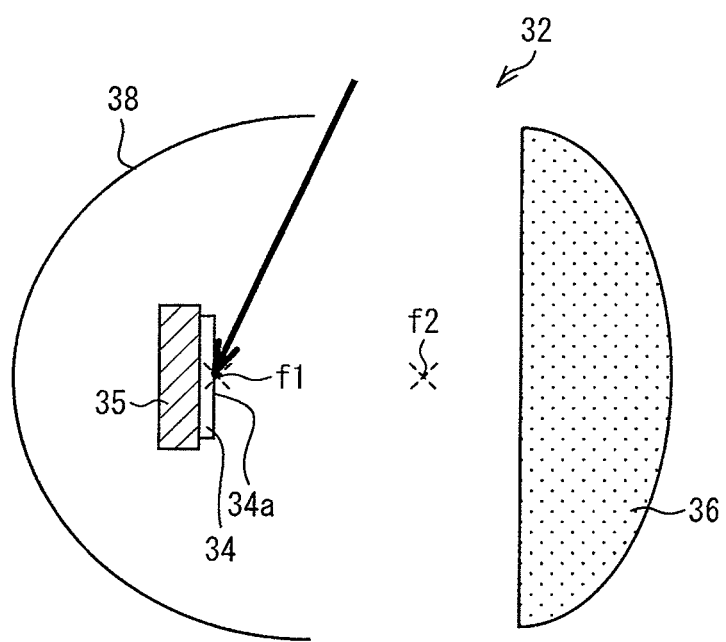

FIG. 24 is a view schematically illustrating a configuration of another headlamp including a projector lens as a light projecting section.

DESCRIPTION OF EMBODIMENTS

The following will describe one embodiment of the present invention with reference to FIGS. 1 through 14.

<Configuration of Headlamp 1>

Figure 1:
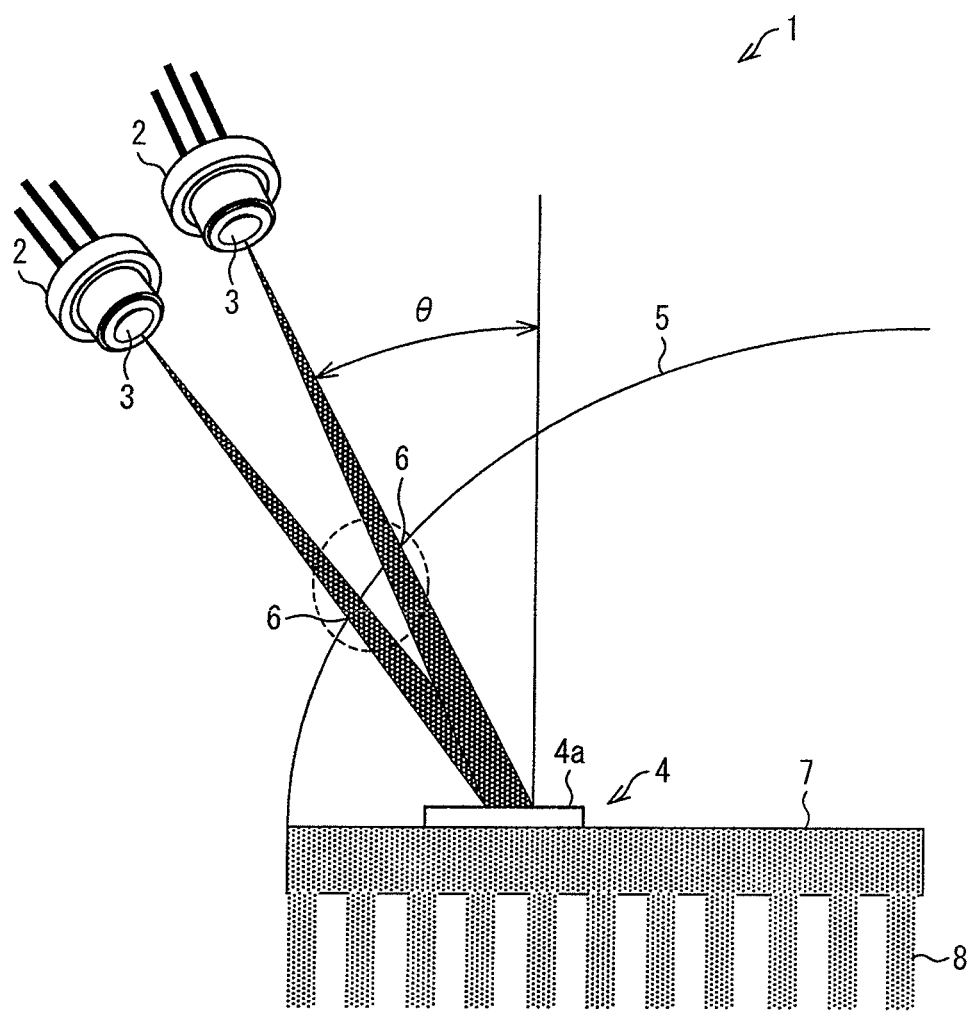
FIG. 1 is a cross-section view schematically illustrating a configuration of a headlamp in accordance with one embodiment of the present invention.

FIG. 1 is a cross-section view schematically illustrating a configuration of a headlamp 1 in accordance with one embodiment of the present invention. As shown in FIG. 1, the headlamp 1 includes a laser element (excitation light source, semiconductor laser) 2, a magnifying lens 3, a light emitting section 4, a parabolic mirror (light projecting section, reflecting mirror) 5, a metallic base (heat conductive member) 7, and fins 8.

(Laser Element 2)

The laser element 2 is a light emitting element functioning as an excitation light source for emitting excitation light. In a configuration shown in FIG. 1, a plurality of laser elements 2 are provided. In the case where the plurality of laser elements 2 are provided, each of the laser elements 2 emits a laser beam serving as excitation light. Instead of the plurality of laser elements 2, only one laser element 2 may be provided. However, a high-power laser beam can be more easily attained with a plurality of laser elements 2 than with only one laser element 2.

The laser element 2 may be a single chip having a single light emitting point, or a single chip having a plurality of light emitting points. The laser element 2 emits a laser beam having a wavelength of, e.g., 405 nm (blue-violet) or 450 nm (blue). However, the wavelength of the laser beam is not limited to these, and can be determined appropriately in accordance with a type of a fluorescent material contained in the light emitting section 4.

Further, instead of the laser element, it is possible to use a light emitting diode (LED) as the excitation light source (light emitting element).

An incident angle (angle θ shown in FIG. 1) at which the laser beam is incident on an upper surface 4a of the light emitting section 4 is set so as to increase use efficiency of fluorescence emitted from the light emitting section 4. Specifically, the angle θ shown in FIG. 1 is preferably 30° or more but not more than 80°. Namely, the incident angle of the laser beam is preferably within a range of 30° or more but not more than 80° with respect to a line perpendicular to the upper surface 4a. The reasons why this angle range is preferable will be described later. Note that the upper surface 4a is a surface of the light emitting section 4 from which most of the fluorescence is emitted.

In the case where the plurality of laser elements 2 are provided, incident angles of respective laser beams emitted from all the laser elements 2 are preferably set so as to fall within the above angle range.

Further, for the purpose of reducing an amount of a laser beam reflected by the surface, the laser beam is preferably P-polarized with respect to the upper surface 4a of the light emitting section 4. This will be described in detail later.

(Magnifying Lens 3)

The magnifying lens 3 is a lens for magnifying an emission range of the laser beam in order that the laser beam from the laser element 2 is appropriately incident on the light emitting section 4. Such magnifying lenses 3 are provided for the respective laser elements 2.

(Light Emitting Section 4)

The light emitting section 4 emits fluorescence upon receiving the laser beam emitted from the laser element 2. The light emitting section 4 includes a fluorescent material for emitting light upon receiving the laser beam. Specifically, the light emitting section 4 is made of a sealing material in which the fluorescent material is dispersed. Alternatively, the light emitting section 4 can be the fluorescent material pressed into a solid. Further alternatively, the light emitting section 4 can be particles of the fluorescent material deposited on a substrate which is made from a material having high heat conductivity. Because the light emitting section 4 converts a laser beam into fluorescence, the light emitting section 4 can be called a wavelength conversion element.

The light emitting section 4 is provided on the metallic base 7 and substantially at a focal point of the parabolic mirror 5. Accordingly, the fluorescence emitted from the light emitting section 4 is reflected by a reflecting curved surface of the parabolic mirror 5, so that an optical path of the fluorescence is controlled.

The laser beam is incident mostly on the upper surface 4a of the light emitting section 4 at the above-described incident angle. The upper surface 4a of the light emitting section 4 can be provided with an anti-reflection structure for preventing reflection of the laser beam.

Examples of the fluorescent material of the light emitting section 4 encompass an oxynitride fluorescent material (e.g., a sialon fluorescent material) and a III-V compound semiconductor nanoparticle fluorescent material (e.g., indium phosphide: InP). These fluorescent materials are high in heat resistance against the high-power (and/or high-light density) laser beam emitted from the laser element 2, and therefore are suitably used in a laser illumination light source. Note, however, that the fluorescent material of the light emitting section 4 is not limited to those described above, and can be other fluorescent materials, such as a nitride fluorescent material.

Further, under the Japanese law, a color of illumination light of a headlamp is limited to white having chromaticity in a predetermined range. For this reason, the light emitting section 4 includes a fluorescent material(s) with which white illumination light is obtained.

For example, white light can be generated by emitting a laser beam of 405 nm onto a light emitting section 4 containing a blue fluorescent material, a green fluorescent material, and a red fluorescent material. Alternatively, white light can be generated by emitting a laser beam of 450 nm (blue) (or a so-called blue-like laser beam having a peak wavelength in a range of 440 nm or more but not more than 490 nm) onto a light emitting section 4 containing a yellow fluorescent material (or a green fluorescent material and a red fluorescent material).

Examples of the sealing material of the light emitting section 4 encompass a glass material (inorganic glass, organic-inorganic hybrid glass) and a resin material such as a silicone resin. The glass material may be glass having a low melting point. It is preferable that the sealing material has high transparency. In a case where a high-power laser beam is used, it is preferable that the sealing material has high heat resistance.

(Parabolic Mirror 5)

The parabolic mirror 5 is a light projecting section for projecting, along a predetermined light projection direction, the fluorescence generated by the light emitting section 4. To be more specific, the parabolic mirror 5 reflects the fluorescence generated by the light emitting section 4 so as to form a pencil of beams (illumination light) that travels in a predetermined solid angle. The parabolic mirror 5 may be, e.g., (i) a member whose surface is coated with a metal thin film or (ii) a metallic member.

Figure 2:
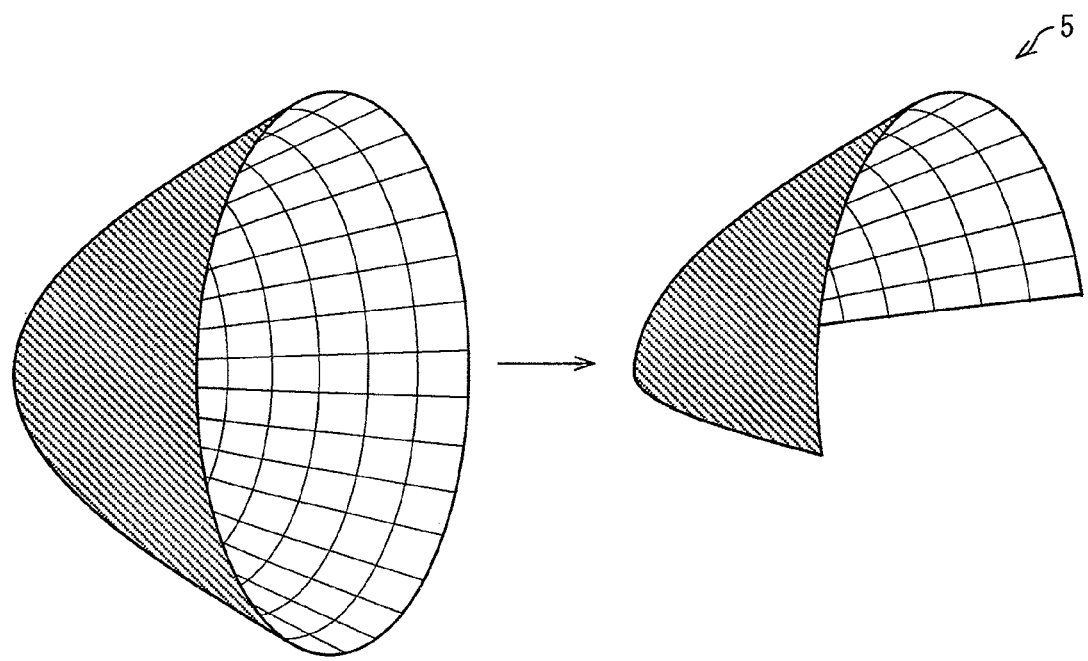
FIG. 2 is a view conceptually illustrating a paraboloid of revolution of a parabolic mirror.

FIG. 2 is a view conceptually illustrating a paraboloid of revolution of the parabolic mirror 5. FIG. 3(*a*) is a top view of the parabolic mirror 5. FIG. 3(*b*) is a front view of the parabolic mirror 5. FIG. 3(*c*) is a side view of the parabolic mirror 5. For simple explanation, each of FIG. 3(*a*) through FIG. 3(*c*) shows an example where the parabolic mirror 5 is formed by hollowing out an inside of a rectangular solid member.

As shown in FIG. 2, the parabolic mirror 5 includes, as its reflecting surface, at least a part of a partial curved surface obtained by (i) forming a curved surface (parabolic curved surface) by rotating a parabola around a rotational axis which is a symmetric axis of the parabola, and by (ii) cutting the curved surface along a plane including the rotational axis. The parabolic curved surface is shown as the curved line indicated by the sign 5*a* in each of FIG. 3(*a*) and FIG. 3(*c*). Further, as shown in FIG. 3(*b*), an opening section 5*b* (an exit through which illumination light exits) of the parabolic mirror 5 is shaped in a half circle when the parabolic mirror 5 is viewed from the front.

A part of the parabolic mirror 5 having such a shape is positioned above the upper surface 4*a* of the light emitting section 4, which upper surface 4*a* has a larger area than that of a side surface of the light emitting section 4. That is, the parabolic mirror 5 is positioned so as to cover the upper surface 4*a* of the light emitting section 4. From another point of view, a part of the side surface of the light emitting section 4 faces the opening section 5*b* of the parabolic mirror 5.

With the above positional relationship between the light emitting section 4 and the parabolic mirror 5, it is possible to efficiently project the fluorescence of the light emitting section 4 into a narrow solid angle. As a result, it is possible to increase use efficiency of the fluorescence.

The laser element 2 is provided outside the parabolic mirror 5, and the parabolic mirror 5 is provided with a window section 6 through which the laser beam is transmitted or passed. A position of the window section 6 is determined according to the incident angle of the laser beam emitted from the laser element 2. Namely, the position of the window section 6 is determined so that the incident angle of the laser beam with respect to the upper surface 4*a* of the light emitting section 4 falls within the previously-described range. Specifically, the window section 6 is provided outside a range of ±30° with respect to the line perpendicular to the upper surface 4*a* of the light emitting section 4.

The window section 6 can be an opening section or a section including a transparent member which can transmit a laser beam. For example, the window section 6 may be a transparent plate provided with a filter which transmits a laser beam but reflects white light (fluorescence generated by the light emitting section 4). With this configuration, it is possible to prevent the fluorescence generated by the light emitting section 4 from leaking from the window section 6.

The number of window sections 6 is not particularly limited. A single window section 6 can be shared by a plurality of laser elements 2. Alternatively, a plurality of window sections 6 can be provided for a plurality of laser elements 2, respectively.

Note that a part of the parabolic mirror 5 may not be a part of the parabola. Further, the reflecting mirror of the light emitting device of the present invention can be (i) a parabolic mirror having an opening section shaped in a closed ring or (ii) the one including such a parabolic mirror. Furthermore, the reflecting mirror is not limited to the parabolic mirror, but may be a mirror having an elliptic surface or a mirror having a hemispheric surface. That is, the reflecting mirror can be any mirror provided that it includes, as its reflecting surface, at least a part of a curved surface formed by rotating a figure (ellipse, circle, parabola) around a rotational axis.

(Metallic Base 7)

The metallic base 7 is a plate-shaped supporting member for supporting the light emitting section 4, and is made from a metal (e.g., copper or iron). Accordingly, the metallic base 7 has high heat conductivity and can efficiently dissipate heat generated by the light emitting section 4. Note that the member for supporting the light emitting section 4 is not limited to a member made from a metal, but may be a member containing a material (glass, sapphire, etc.) having high heat conductivity other than a metal. Note also that, preferably, a surface of the metallic base 7 which surface is in contact with the light emitting section 4 functions as a reflecting surface. Configuring the surface of the metallic base 7 as the reflecting surface enables the followings: (i) After a laser beam entering the light emitting section 4 via the upper surface 4*a* is converted into fluorescence, the fluorescence is reflected by the reflecting surface so as to be directed toward the parabolic mirror 5. (ii) A laser beam entering the light emitting section 4 via the upper surface 4*a* is reflected by the reflecting surface and is directed to the inside of the light emitting section 4, so that the laser beam is converted into fluorescence.

The metallic base 7 is covered with the parabolic mirror 5. That is, the metallic base 7 has a surface facing the reflecting curved surface (parabolic curved surface) of the parabolic mirror 5. Preferably, the surface of the metallic base 7 on which surface the light emitting section 4 is provided is substantially parallel to the rotational axis of the paraboloid of revolution of the parabolic mirror 5 and substantially includes the rotational axis.

(Fins 8)

The fins 8 function as a cooling section (heat dissipation mechanism) for cooling the metallic base 7. The fins 8 are configured as a plurality of heat dissipating plates, so that the fins 8 have an increased contact area with the atmosphere. This allows the fins 8 to have improved heat dissipation efficiency. The cooling section for cooling the metallic base 7 only needs to have a cooling (heat dissipation) function. The cooling section may employ a heat pipe, a water-cooling system, or an air-cooling system, as described later.

<Shape of Light Emitting Section 4>

The previously-described range of the preferable incident angle of the laser beam has been worked out based on the assumption that the fluorescence is hardly emitted from the side surface of the light emitting section 4. Now, the following will describe a shape of the light emitting section 4 having the side surface from which the fluorescence is hardly emitted.

(Thickness of Light Emitting Section 4)

Figure 4:
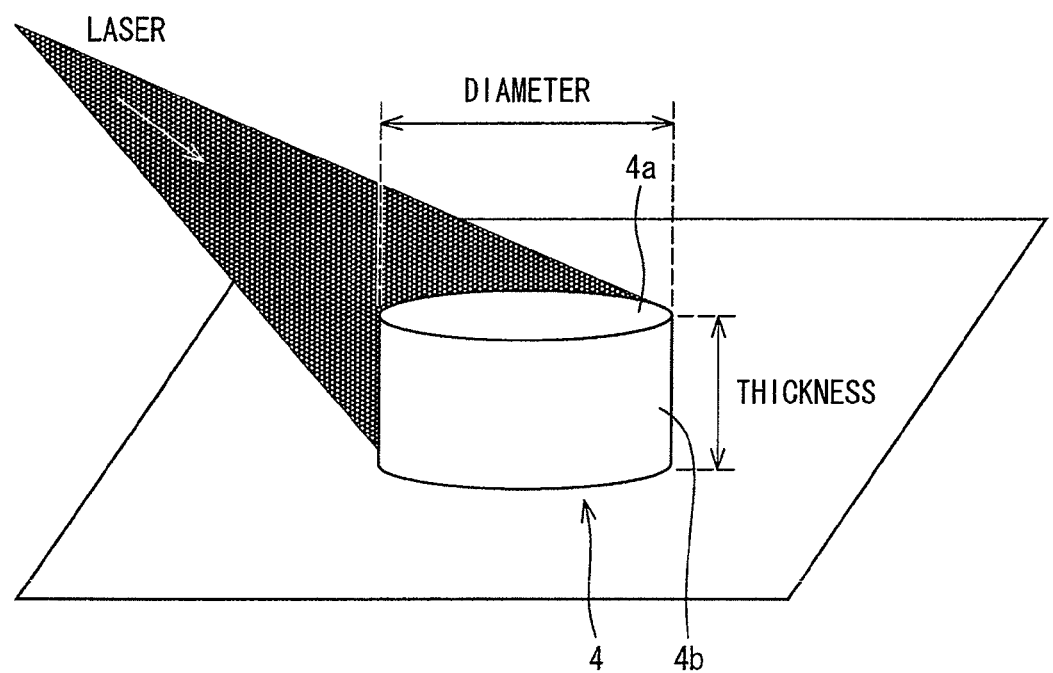
FIG. 4 is a view illustrating a state where a laser beam is emitted onto a light emitting section.
Figure 5:
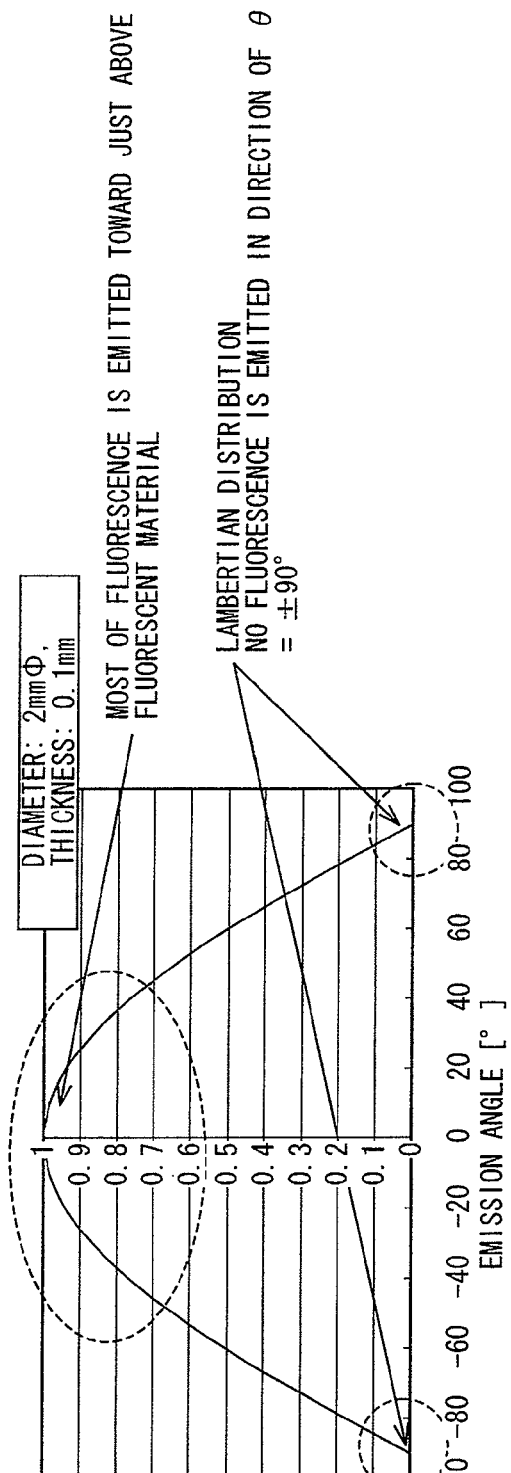
FIG. 5($a$) is a graph showing an optical emission property of a light emitting section having a small thickness.
Figure 5:
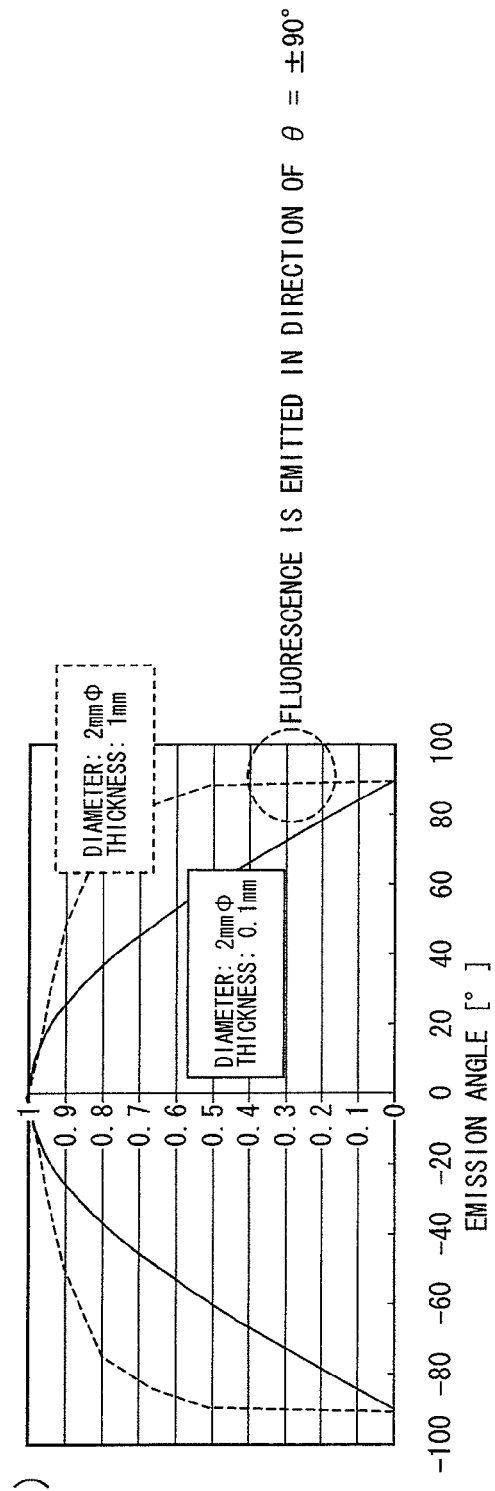

FIG. 4 is a view illustrating a state where a laser beam is emitted onto the light emitting section 4. FIG. 4 shows the light emitting section 4 shaped in a circular cylinder. The light emitting section 4 has the upper surface 4a via which most of the laser beam is received. A distance between the upper surface 4a and a bottom surface of the light emitting section 4, which bottom surface faces the upper surface 4a, corresponds to a thickness of the light emitting section 4. The light emitting section 4 preferably has a small thickness. In other words, an area of a side surface 4b of the light emitting section 4 is preferably small. The description that "the light emitting section has a small thickness" means a shape of such a light emitting section that a side surface has a sufficiently smaller area than that of an upper surface and therefore most of the fluorescence is emitted upwardly (i.e., emitted via the upper surface). The following description deals with the reason why the light emitting section 4 preferably has a small thickness.

FIG. 5(a) is a graph showing an optical emission property of a light emitting section 4 having a small thickness (diameter: 2 mm, thickness: 0.1 mm). FIG. 5(b) is a graph overlapping the graph of FIG. 5(a) and showing an optical emission property of a light emitting section 4 having a large thickness (diameter: 2 mm, thickness: 1 mm).

As shown in FIG. 5(a), in the case of the light emitting section 4 having the small thickness, the light emitting section 4 has a side surface 4b whose area is small, and therefore most of the fluorescence is emitted toward just above the light emitting section 4. Namely, the fluorescence is hardly emitted in a direction inclined at 90° ($\theta=\pm 90°$) with respect to a line perpendicular to an upper surface 4a of the light emitting section 4. Thus, distribution of the fluorescence corresponds to the Lambertian distribution (i.e., fluorescence emission distribution being approximate to $\cos(\theta)$, where an angle with respect to the line perpendicular to the upper surface 4a of the light emitting section 4 is $\theta$).

On the other hand, as shown in FIG. 5(b), in the case of the light emitting section 4 having the large thickness, the fluorescence is emitted in a direction inclined at 90° ($\theta=\pm 90°$) with respect to a line perpendicular to an upper surface 4a of the light emitting section 4. Thus, distribution of the fluorescence does not correspond to the Lambertian distribution. That is, there is an increase in a percentage of the fluorescence emitted from the side surface 4b of the light emitting section 4. A part of the fluorescence emitted from the side surface 4b of the light emitting section 4 is not incident on the parabolic mirror 5 but is emitted to the outside via the opening section 5b of the parabolic mirror 5, so as to be dispersed in the atmosphere (see FIG. 13). Therefore, in the case where the percentage of the fluorescence emitted from the side surface 4b of the light emitting section 4 is increased, an amount of fluorescence that cannot be controlled by the parabolic mirror 5 is increased. This results in a reduction in use efficiency of the fluorescence (and also use efficiency of the laser beam).

Thus, designing the light emitting section 4 to have a small thickness makes it possible to reduce a percentage of fluorescence that cannot be controlled by the parabolic mirror 5, and therefore to increase use efficiency of the fluorescence generated by the light emitting section 4.

Figure 6:
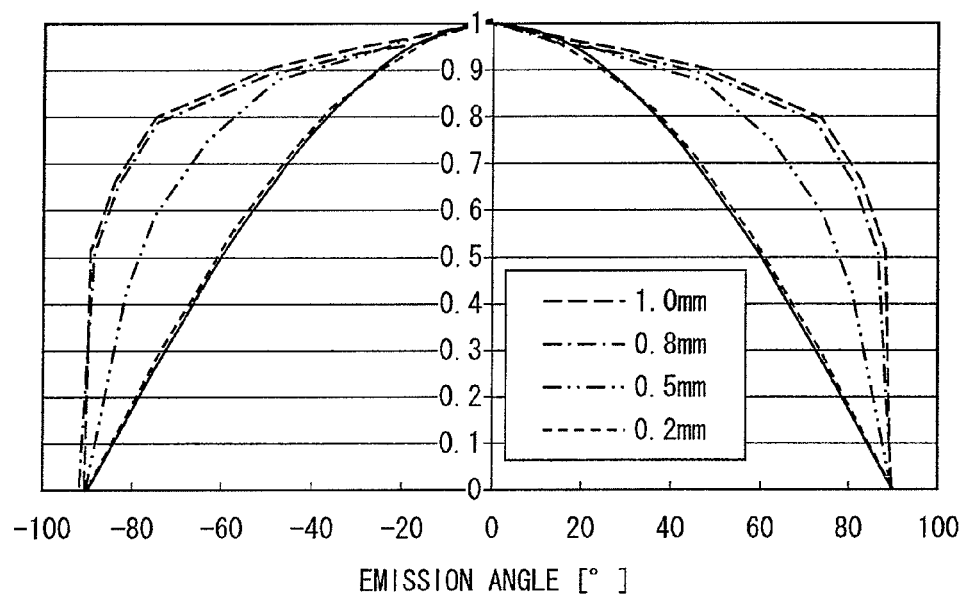
FIG. 6 is a graph showing a relationship between a thickness of a light emitting section and an optical emission property of the light emitting section.

FIG. 6 is a graph showing a relationship between a thickness of the light emitting section 4 and an optical emission property of the light emitting section 4. Here, a diameter of the light emitting section 4 is set to 2 mm, and the thickness of the light emitting section 4 is decreased from 1.0 mm to 0.2 mm in stages. Then, as shown in FIG. 6, distribution of the fluorescence corresponds to the Lambertian distribution when the thickness of the light emitting section 4 is 0.2 mm.

Therefore, the thickness of the light emitting section 4 is preferably set to be not more than one-tenth of a maximum width among widths of the light emitting section 4 which widths are along a direction perpendicular to a thickness direction of the light emitting section 4 (i.e., along a lateral direction). In a case where the light emitting section 4 is shaped in a circular cylinder, the maximum width is equal to the diameter of the upper surface of the light emitting section 4. Whereas, in a case where the light emitting section 4 is shaped in a rectangular solid, the maximum width is equal to a length of a diagonal line of the upper surface (rectangle) of the light emitting section 4.

In a case where the thickness of the light emitting section 4 is too small, an amount of resulting illumination light might be insufficient. In order to avoid this, the lower limit of the thickness of the light emitting section 4 is set to be equal to a minimum thickness among thicknesses with which a desired amount of illumination light can be obtained. As an extreme instance, the lower limit of the thickness of the light emitting section 4 is equal to a thickness of a single fluorescent layer, which is necessary at minimum, and such lower limit is, e.g., 10 µm. Further, the upper limit (absolute value) of the thickness of the light emitting section 4 is preferably set also taking into consideration of the heat dissipation efficiency of the light emitting section 4. The reason for this is as follows. As the light emitting section 4 has a greater thickness, the heat dissipation efficiency is reduced in a side of the light emitting section 4 which side is opposite to another side of the light emitting section 4, the another side being in contact with the metallic base 7.

(Area of Upper Surface 4a of Light Emitting Section 4)

Instead of by reducing the thickness of the light emitting section 4, the distribution of the fluorescence of the light emitting section 4 can be made correspond to the Lambertian distribution by setting a spot of a laser beam incident on the upper surface 4a of the light emitting section 4 to have a smaller area than an area of the upper surface 4a. That is, the distribution of the fluorescence generated by the light emitting section 4 can be made correspond to the Lambertian distribution by exciting, with a laser beam, a part of the light emitting section 4 (i.e., a part of the light emitting section 4 which part is in the vicinity of a center of the light emitting section 4).

Figure 7:
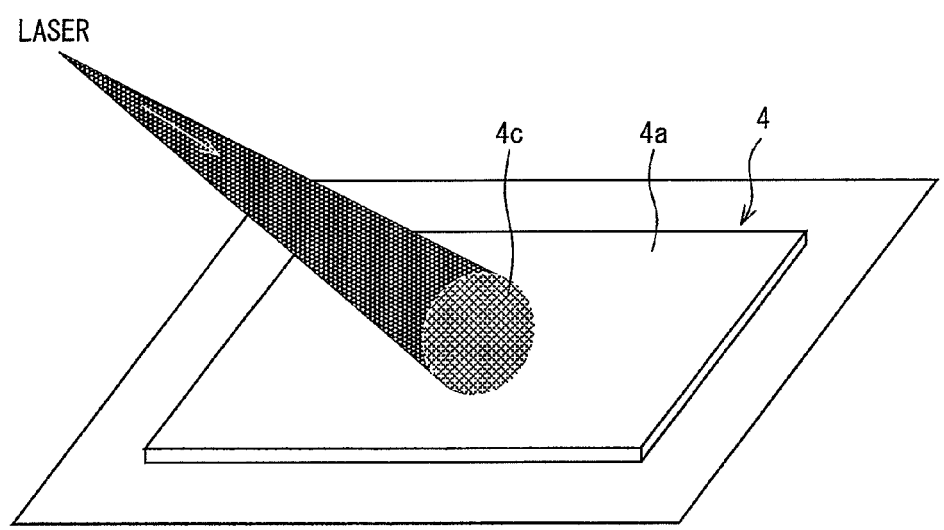
FIG. 7 is a view illustrating a state where a laser beam is emitted onto the upper surface of the light emitting section.

FIG. 7 is a view illustrating a spot 4c of a laser beam which is emitted onto the upper surface 4a of the light emitting section 4. As shown in FIG. 7, the upper surface 4a of the light emitting section 4 has a larger area than an area of the spot 4c of the laser beam. With this, the distribution of the fluorescence generated by the light emitting section 4 corresponds to the Lambertian distribution, irrespective of the thickness of the light emitting section 4. The reason for this is considered as follows. The fluorescence traveling toward the side surface of the light emitting section 4 is diffused inside the light emitting section 4, and consequently is not emitted via the side surface of the light emitting section 4.

A percentage of the area of the spot of the laser beam with respect to the area of the upper surface 4a only needs to be reduced to such a degree that the laser beam would not leak from the side surface of the light emitting section 4. Note that there is no upper limit for the area of the upper surface 4a.

<Preferable Incident Angle of Laser Beam>

Next, the following will describe details of the range of the preferable incident angle of the laser beam. Each of FIG. 8(a) and FIG. 8(b) is a view illustrating the incident angle of the laser beam with respect to the upper surface 4a of the light emitting section 4. Assuming that an optical path of the laser beam has no width, an incident angle of a laser beam 2a with respect to the upper surface 4a of the light emitting section 4 corresponds to, as shown in FIG. 8(a), an angle θ with respect to a reference axis (0°), which is a line perpendicular to the upper surface 4a. A case where the optical path of the laser beam has a width will be described later.

FIG. 9(a) is a graph illustrating dispersion of fluorescence. FIG. 9(b) is a view showing a percentage of an integrated value of fluorescence with respect to a total amount of fluorescence, which percentage is observed in each angle range. FIG. 10 is a view illustrating a positional relationship between (i) an emission range of a laser beam and (ii) the parabolic mirror 5. As shown in FIG. 9(a) and FIG. 9(b), approximately 50% of a total luminous flux is released in an angle range of ±30° with respect to the perpendicular line extending from the center of the upper surface 4a of the light emitting section 4.

Therefore, as shown in FIG. 10, providing the window section 6 in the range of ±30° (i.e., the region indicated by the sign 5c in FIG. 10) leads to leakage of the fluorescence from the window section 6. This increases a loss of the fluorescence. Even in a case where the laser element 2 is provided inside the parabolic mirror 5, providing the laser element 2 in the range of ±30° causes the fluorescence to be absorbed or diffused by the laser element 2, thereby increasing a loss of the fluorescence. For this reason, the lower limit of the incident angle of the laser beam is 30°. In other words, the window section 6 is provided outside the range of ±30° with respect to the perpendicular line extending from the center (i.e., substantially the focal point of the parabolic mirror 5) of the upper surface 4a of the light emitting section 4.

Meanwhile, consider a case where the incident angle is too shallow. Then, as shown in FIG. 11, whichever of an S-polarized laser beam (S-wave) and a P-polarized laser beam (P-wave) is used, a reflectance of the laser beam becomes great and accordingly the laser beam is not incident on the light emitting section 4. FIG. 11 is a graph showing changes in respective reflectances of the S-polarized laser beam and the P-polarized laser beam which changes are caused by changes in their incident angles. FIG. 11 shows a reflectance observed when a laser beam having a wavelength of 405 nm is incident on the light emitting section 4 whose refractive index is 2.0. Note that each of the expressions "S-polarized" and "P-polarized" means a polarizing direction with respect to the upper surface 4a of the light emitting section 4.

Assume that the P-polarized laser beam, which has a low reflectance, is used. Then, at an incident angle exceeding 80°, there occurs a significant increase in the reflectance, and consequently the laser beam cannot be used effectively. Therefore, the upper limit of the incident angle of the laser beam is 80°.

In view of these, the incident angle of the laser beam is preferably within a range of 30° or more but not more than 80° with respect to the line perpendicular to the upper surface 4a of the light emitting section 4. Particularly, the incident angle of the laser beam is more preferably within a range of 40° or more but not more than 70°. This is because that, with the incident angle within this range, it is possible to further reduce the effects caused by providing the window section 6 in the parabolic mirror 5 and to further reduce an amount of the laser beam reflected by the surface of the light emitting section 4. Moreover, the incident angle of the laser beam is further more preferably within a range of 60° or more but not more than 65°. This is because that, with the incident angle within this range, the incident angle of the laser beam corresponds to the Brewster's angle, and consequently the reflectance can be significantly reduced.

(Case where Optical Path of Laser Beam has Width)

As shown in FIG. 8(b), in a case where the optical path of the laser beam has a width and the width changes according to a distance from the light source, the laser beam does not have a single incident angle in a precise sense. As described above, the lower limit of the incident angle of the laser beam is preferably 30° or more in order that the window section 6 is not provided in the angle range of ±30° with respect to the perpendicular line extending from the center of the upper surface 4a of the light emitting section 4. From this viewpoint, in a case where the laser beam is emitted from a side on which the vertex of the parabolic mirror 5 is located, an angle of a line which is the closest to the opening section 5b of the parabolic mirror 5, among lines included in an outer edge of an optical path of the laser beam, is preferably 30° or more (this angle corresponds to an angle of an outer edge line, which angle is shown as "θ" in FIG. 8(b)).

Note that, in a case where the laser beam is emitted from a side on which the opening section 5b of the parabolic mirror 5 is located, an angle of a line which is the closest to the vertex of the parabolic mirror 5, among lines included in an outer edge of an optical path of the laser beam, is preferably 30° or more.

Meanwhile, for the purpose of reducing an amount of the laser beam reflected by the surface of the light emitting section 4, the incident angle is preferably considered while taking into consideration an angle of a central axis of the optical path of the laser beam, which angle corresponds to an average of the incident angles of the optical path of that laser beam. Thus, the angle of the central axis of the optical path of the laser beam is preferably 80° or less.

At the Brewster's angle, an amount of the laser beam reflected by the surface of light emitting section 4 is minimum. Therefore, the angle of the central axis of the optical path of the laser beam is preferably set to the Brewster's angle (60° or more but not more than 65°).

Note that, in a case where the optical path of the laser beam has a width but the laser beam is parallel light, the laser beam has a single incident angle. Therefore, such a case can be discussed in substantially the same way as the case where the optical path of the laser beam is regarded as having no width.

<Light Projection Property of Parabolic Mirror 5>

FIG. 12 is a view conceptually illustrating a light projection property of the parabolic mirror 5. The inventors of the present invention reached the following finding. As shown in FIG. 12, in a case where the headlamp 1 is positioned so that the metallic base 7 is located on a lower side, most of the fluorescence that cannot be controlled by the parabolic mirror 5 (indicated by the sign 30) is emitted upwardly above the parabolic mirror 5, and such the fluorescence is hardly emitted downwardly.

FIG. 13 is an explanatory view for illustrating a principle of the light projection property of the parabolic mirror 5. As illustrated in FIG. 13, the fluorescence emitted via the upper surface of the light emitting section 4 (indicated by the sign 31) is reflected by the parabolic mirror 5, and then is emitted forward within a predetermined solid angle.

On the other hand, a part of the fluorescence emitted via the side surface of the light emitting section 4 (indicated by the sign 30) is not incident on the parabolic mirror 5, but travels obliquely upward at an angle out of the predetermined solid angle. Further, the fluorescence emitted from the side surface of the light emitting section 4 in parallel with the surface of the metallic base 7 travels forward as parallel light. Accordingly, the fluorescence that cannot be controlled by the parabolic mirror 5 is hardly emitted downwardly below the headlamp 1. By taking advantage of this light projection property, it is possible to moderately irradiate, with the fluorescence that cannot be controlled by the parabolic mirror 5, a space on a side on which the parabolic mirror 5 of the headlamp 1 is provided.

<Mounting of Headlamp 1>

FIG. 14 is a view conceptually illustrating an orientation of the headlamp 1 mounted as a headlamp of an automobile (vehicle) 10. As shown in FIG. 14, the headlamp 1 is preferably attached to a head of the automobile 10 so that the parabolic mirror 5 is positioned on a lower side in a vertical direction. By mounting the headlamp 1 in the automobile 10 in this manner, the automobile 10 can emit bright light in its front direction and also can emit light having moderate brightness in its forward-downward direction, thanks to the above-described light projection property of the parabolic mirror 5.

As described above, a vehicle of the present invention includes a vehicle headlamp. The vehicle headlamp includes an excitation light source for emitting excitation light, a light emitting section for emitting fluorescence upon receiving the excitation light emitted from the excitation light source, a reflecting mirror having a reflecting curved surface for reflecting the fluorescence emitted by the light emitting section, and a supporting member (metallic base 7) (i) having a surface facing the reflecting curved surface and (ii) supporting the light emitting section. A part of the reflecting mirror is located above an upper surface of the light emitting section, which upper surface has a larger area than that of a side surface of the light emitting section. The light emitting section has a small thickness, or a spot of the excitation light incident on the surface of the light emitting section has a smaller area than an area of the surface. The vehicle headlamp is attached to the vehicle so that the reflecting curved surface is positioned on a lower side in a vertical direction. Further, an incident angle of the excitation light with respect to the upper surface of the light emitting section is set so that use efficiency of the fluorescence emitted from the light emitting section is increased.

Note that the headlamp 1 can be employed as a driving headlamp (high-beam headlamp) of a vehicle or a passing headlamp (low-beam headlamp) of a vehicle.

<Application Examples of Present Invention>

A light emitting device of the present invention is applicable not only to a vehicle headlamp but also to other illumination devices. For example, an illumination device of the present invention can be a downlight. The downlight is an illumination device attached to a ceiling of a structure such as a house or a vehicle. Instead, the illumination device of the present invention can be achieved as a headlamp for a moving object (e.g., a human, a ship, an airplane, a submersible, or a rocket) other than a vehicle. Further, the illumination device of the present invention can be achieved as a searchlight, a projector, or an interior illumination device (such as a stand light) other than the downlight.

EXAMPLES

The following description deals with concrete examples of the present invention with reference to FIGS. 15 through 22. Note that members which are identical with members described in the foregoing embodiments have the same signs as those of the members described in the foregoing embodiments, and explanations of these are omitted here for the sake of simple explanation. Further, materials, shapes, and various values described below are merely examples, and the present invention is not limited to these.

Example 1

FIG. 15 is a view schematically illustrating a headlamp 21 in accordance with one example of the present invention. As shown in FIG. 15, the headlamp 21 includes a plurality of sets each including a laser element 2 and a condenser lens 11, a plurality of optical fibers (light-guiding members) 12, magnifying lens 13, a reflecting mirror 14, a light emitting section 4, a parabolic mirror 5, a metallic base 7, and fins 8.

Each of the condenser lenses 11 is a lens for causing a laser beam emitted from a corresponding one of the laser elements 2 to be incident on an incident end section of a corresponding one of the optical fibers 12, which incident end section is one of ends of the corresponding one of the optical fibers 12. The plurality of sets each including the laser element 2 and the condenser lens 11 are provided for the plurality of optical fibers 12, respectively. Namely, the laser elements 2 are optically coupled with the optical fibers 12, respectively, via the respective plurality of condenser lens 11.

Each of the plurality of optical fibers 12 is a light-guiding member for guiding, to the light emitting section 4, a laser beam emitted from a corresponding one of the laser elements 2. The optical fiber 12 has a two-layer structure in which a center core is coated with a clad having a lower refractive index than that of the center core. The laser beam incident on the incident end section travels though the optical fiber 12, and then exits from an output end section, which is the other one of the ends of the optical fiber 12. The output end sections of the plurality of optical fibers 12 are bounded up with a ferrule or the like.

The laser beams emitted from the exit end sections of the respective plurality of optical fibers 12 are enlarged by the magnifying lens 13 (convex lens) so that the entire light emitting section 4, having an upper surface whose diameter is 2 mm, is irradiated with the laser beams. The enlarged laser beams are reflected by the reflecting mirror 14, so that an optical path of the laser beams is changed. Consequently, the laser beams are led to the light emitting section 4 through the window section 6 of the parabolic mirror 5. A position and an angle of the reflecting mirror 14 are set so that the laser beams are incident on the upper surface 4a of the light emitting section 4 at an angle of 45°.

(Details of Laser Element 2)

Each of the laser elements 2 emits a laser beam having a wavelength of 405 nm and has an output of 1 W. The headlamp 21 includes eight laser elements 2 in total. Accordingly, a total output of these laser elements 2 is 8 W. Each of the laser elements 2 is set so that a P-polarized component among components of the laser beam is incident on the surface of the light emitting section 4.

(Details of Light Emitting Section 4)

The light emitting section 4 contains a mixture of three kinds of fluorescent materials, i.e., RGB fluorescent materials, so as to emit white light. The red fluorescent material is $CaAlSiN_3$:Eu, the green fluorescent material is β-SiAlON: Eu, and the blue fluorescent material is $(BaSr)MgAl_{10}O_{17}$: Eu. Powders of these fluorescent materials are sintered into a solid.

The light emitting section 4 is shaped in, for example, a disc having a diameter of 2 mm and a thickness of 0.2 mm.

(Details of Parabolic Mirror 5)

The parabolic mirror 5 has an opening section 5b shaped in a half circle whose radius is 30 mm. The parabolic mirror 5 has a depth of 30 mm. The light emitting section 4 is provided at a focal point of the parabolic mirror 5.

(Details of Metallic Base 7)

The metallic base 7 is made from copper, and aluminum is vapor-deposited on a surface of the metallic base 7 on which surface the light emitting section 4 is to be provided. On a surface of the metallic base 7 opposite to the surface on which aluminum is vapor-deposited, the fins 8 each having a length of 15 mm and a width of 1 mm are provided at intervals of 5 mm. Note that the metallic base 7 and the fins 8 can be formed integral with each other.

(Effects of Headlamp 21)

According to the headlamp 21, the light emitting section 4 has a small thickness, and the upper surface of the light emitting section 4 faces a reflecting curved surface of the parabolic mirror 5. Therefore, it is possible to control, by the parabolic mirror 5, most of the fluorescence emitted from the light emitting section 4. This can reduce an amount of the fluorescence that cannot be controlled by the parabolic mirror 5, thereby increasing use efficiency of the fluorescence.

Further, the incident angle of the laser beam with respect to the upper surface 4a of the light emitting section 4 is 45°. This allows the window section 6 to be provided outside a region of the reflecting curved surface of the parabolic mirror 5 which region receives approximately 50% of the fluorescence. This makes it possible to increase use efficiency of the fluorescence emitted from the light emitting section 4. Furthermore, since the incident angle of the laser beam is 45°, it is possible to reduce an amount of the laser beam reflected by the upper surface 4a of the light emitting section 4.

Therefore, the headlamp 21 can efficiently project light with a small loss in the fluorescence.

Example 2

FIG. 16 is a view schematically illustrating a headlamp 22 in accordance with another example of the present invention. As shown in FIG. 16, the headlamp 22 includes a plurality of sets each including a laser element 2 and a condenser lens 11, a plurality of optical fibers 12, a magnifying lens 13, a reflecting mirror 14, a light emitting section 4, a parabolic mirror 5, a metallic base 7, fins 8, and a fan 15.

According to the headlamp 22, a position and an angle of the reflecting mirror 14 are set so that a laser beam is incident on an upper surface 4a of the light emitting section 4 at an angle of 63°.

One of differences in configuration between Examples 1 and 2 is that Example 2 includes the fan 15, which is provided below the fins 8. The fan 15 sends air to the metallic base 7 and the fins 8. This increases a heat dissipation effect achieved by the metallic base 7 and the fins 8. The metallic base 7 and the fins 8 of Example 2 are identical to those used in Example 1.

(Details of Laser Element 2)

Each of the laser elements 2 emits a laser beam having a wavelength of 450 nm and has an output of 1 W. The headlamp 22 includes six laser elements 2 in total. Accordingly, a total output of these laser elements 2 is 6 W. Each of the laser elements 2 is set so that a P-polarized component among components of the laser beam, which P-polarized component is less reflected by a surface of the light emitting section 4, is incident on the surface of the light emitting section 4.

(Details of Light Emitting Section 4)

The light emitting section 4 contains one kind of fluorescent material which emits yellow light. The fluorescent material is, for example, $(Y_{1-x-y}Gd_xCe_y)_3Al_5O_{12}$ ($0.1 \leq x \leq 0.55$, $0.01 \leq y \leq 0.4$). Powder of such the yellow fluorescent material is mixed with a resin, and the resulting mixture is applied to the metallic base 7.

The light emitting section 4 is shaped in, for example, a disc having a diameter of 2 mm and a thickness of 0.1 mm.

(Details of Parabolic Mirror 5)

The parabolic mirror 5 has an opening section 5b shaped in a half circle whose radius is 50 mm. The parabolic mirror 5 has a depth of 45 mm. The light emitting section 4 is provided at a focal point of the parabolic mirror 5.

(Unique Effects of Headlamp 22)

According to the headlamp 22, the laser beam is incident on the upper surface 4a of the light emitting section 4 at an angle of 63°. This angle is approximate to the Brewster's angle. Therefore, it is possible to effectively reduce an amount of the laser beam reflected by the upper surface 4a of the light emitting section 4.

Example 3

FIG. 17 is a view schematically illustrating a headlamp 23 in accordance with further another example of the present invention. As shown in FIG. 17, the headlamp 23 includes a plurality of sets each including a laser element 2 and a magnifying lens 3, a light emitting section 4, a parabolic mirror 5, a metallic base 7, and a water-cooling pipe (cooling section) 16.

The headlamp 23 includes eight laser elements 2 each of which emits a laser beam having a wavelength of 450 nm and has an output of 1 W (i.e., 8 W in total of the eight laser elements 2). These laser elements 2 are arranged in three lines such that (i) three laser elements 2 are arranged in one line, (ii) two laser elements 2 are arranged in another line, and (iii) three laser elements 2 are arranged in the other line. These three lines are arranged in a closest manner in a vertical direction (i.e., in a z-axis direction in FIG. 18). FIG. 18 is a top view illustrating the arrangement of the plurality of laser elements 2.

The laser beams emitted from the laser elements 2 arranged in the three lines are enlarged by the magnifying lens 3 so as to form a spot having a diameter of 2 mm on an upper surface 4a of the light emitting section 4.

The parabolic mirror 5 is provided with the window section 6 which transmits a laser beam whose incident angle is in a range from 30° to 70°. The laser beams emitted from the eight laser elements 2 are transmitted through the window section 6, so as to be incident on the light emitting section 4. An incident angle of each of the laser beams with respect to the upper surface 4a of the light emitting section 4 falls within the range of 30° or more but not more than 70°.

Therefore, the window section 6 can be provided outside a region of a reflecting curved surface of the parabolic mirror 5 which region receives approximately 50% of the fluorescence. This makes it possible to increase use efficiency of the fluorescence emitted from the light emitting section 4.

(Details of Light Emitting Section 4)

One of differences between Examples 1 and 3 in terms of the light emitting section 4 is that, in Example 3, the light emitting section 4 has the upper surface 4a (laser beam irradiated surface) whose area is larger than that of the spot of the laser beam. The light emitting section 4 is shaped in a disc having a diameter of 10 mm and a thickness of 0.1 mm. Powders of three kinds of fluorescent materials, which are the same as those used in Example 1, are uniformly mixed with a resin, and the resulting mixture is applied to the metallic base 7. The laser beams are incident on the light emitting section 4 as a circular spot having a diameter of 2 mm. The circular spot of the laser beams is incident on a position of the light emitting section 4 which position substantially coincides with (i) a focal point of the parabolic mirror 5 and (ii) a center of the upper surface 4a of the light emitting section 4.

As described above, the upper surface 4a of the light emitting section 4 has a larger area than that of the spot of the laser beams. Consequently, the fluorescence would hardly exit from a side surface of the light emitting section 4. It is therefore possible to reduce an amount of the fluorescence that cannot be controlled by the parabolic mirror 5 and to increase use efficiency of the fluorescence.

(Details of Metallic Base 7)

Another major difference between Examples 1 and 3 is that, in Example 3, the water-cooling pipe 16 is provided inside the metallic base 7. Coolant water flows through the water-cooling pipe 16. Circulating the coolant water through the water-cooling pipe 16 cools the metallic base 7. This makes it possible to increase heat dissipation efficiency of the metallic base 7 with respect to the light emitting section 4. Note that the metallic base 7 of Example 3 is the same as that of Example 1 in terms of that the metallic base 7 is made from copper, and aluminum is vapor-deposited on a surface of the metallic base 7 on which surface the light emitting section 4 is to be provided.

(Details of Parabolic Mirror 5)

The parabolic mirror 5 has an opening section 5b shaped in a half circle whose radius is 30 mm. The parabolic mirror 5 has a depth of 30 mm. The light emitting section 4 is provided at a focal point of the parabolic mirror 5.

Example 4

FIG. 19 is a view schematically illustrating a headlamp 24 in accordance with still another example of the present invention. The headlamp 24 includes an array laser 41, a light-guiding section 42, a light emitting section 4, a parabolic mirror 5, a metallic base 7, and fins 8.

The array laser 41 is a multi-emitter laser array made of 10 emitters integrated into a single package, and has a total output of 8 W. Instead, as a laser beam source having a similar function, such an array laser can be used that includes a plurality of laser elements each emitting a laser beam. The array laser 41 is set so that a P-polarized component among components of the laser beam, which P-polarized component is less reflected by a surface of the light emitting section 4, is incident on the surface of the light emitting section 4. The array laser 41 is provided in the vicinity of an incident surface 42a of the light-guiding section 42.

The light-guiding section 42 is a light-guiding member, shaped in a wedge (a pyramid or a prismoid), for converging a plurality of laser beams emitted from the array laser 41 and guiding the laser beams to the light emitting section 4. The light-guiding section 42 is made from, e.g., quartz ($SiO_2$). The laser beams entering the light-guiding section 42 are subjected to total reflection by internal side surfaces of the light-guiding section 42.

The light-guiding section 42, penetrating through a window section 6 (opening section) of the parabolic mirror 5, is provided such that (i) the incident surface 42a, which is one of ends of the light-guiding section 42, is positioned outside the parabolic mirror 5 and (ii) an exit surface 42b, which is the other of the ends of the light-guiding section 42, is positioned in the vicinity of the light emitting section 4.

The laser beams emitted from the array laser 41 enter the light-guiding section 42 via the incident surface 42a of the light-guiding section 42. The laser beams having entered the light-guiding section 42 are guided through the light-guiding section 42 while being subjected to total reflection in the light-guiding section 42, so as to exit from the exit surface 42b of the light-guiding section 42.

The exit surface 42b has a cross-sectional area smaller than an area of the incident surface 42a (namely, the light-guiding section 42 is tapered). Therefore, the laser beams having entered the light-guiding section 42 are converged while traveling toward the exit surface 42b.

The light emitting section 4 is provided in the vicinity of the exit surface 42b of the light-guiding section 42. The laser beams exited from the exit surface 42b are incident on a substantially center of an upper surface of the light emitting section 4 as a spot having a diameter of 2 mm.

As described previously, the window section 6 is preferably provided outside the range of ±30° with respect to the line perpendicular to the upper surface 4a of the light emitting section 4. Therefore, an angle made by (i) this perpendicular line and (ii) a side surface 42c of the light-guiding section 42 which side surface 42c is closer to an opening section 5b of the parabolic mirror 5 is set to be greater than 30°.

Further, in order to reduce an amount of the laser beams emitted from the exit surface 42b and reflected by the surface of the light emitting section 4, an angle made by (i) the above perpendicular line and (ii) a central axis (i.e., a perpendicular line extending from a center of the incident surface 42a) 42d of the light-guiding section 42 is set to be 80° or smaller. For example, this angle is 45°.

(Details of Parabolic Mirror 5)

The parabolic mirror 5 has the opening section 5b shaped in a half circle whose radius is 30 mm. The parabolic mirror 5 has a depth of 30 mm. The light emitting section 4 is provided at a focal point of the parabolic mirror 5.

(Details of Light Emitting Section 4)

The light emitting section 4 is shaped in a disc having a diameter of 2 mm and a thickness of 0.2 mm. A composition of the light emitting section 4 of Example 4 is the same as that of Example 1. Namely, powders of fluorescent materials are sintered into a solid.

The metallic base 7 and the fins 8 of Example 4 are identical to those used in Example 1.

(Unique Effects of Headlamp 24)

The headlamp 24 uses the light-guiding section 42. Therefore, according to the headlamp 24, it is easy to converge the plurality of laser beams emitted from the array laser 41 and to cause the laser beams to be incident on the light emitting section 4 at a desired angle. Furthermore, according to the headlamp 24, the window section 6 through which the light-guiding section 42 is provided is positioned outside a region of the reflecting curved surface of the parabolic mirror 5 which region receives approximately 50% of the fluorescence. Therefore, the headlamp 24 can efficiently project light with a small loss in the fluorescence.

Example 5

FIG. 20 is a view schematically illustrating a headlamp 25 in accordance with yet another example of the present invention. As shown in FIG. 20, the headlamp 25 includes a plurality of sets each including a laser element 2 and a condenser lens 11, a plurality of optical fibers 12, a light emitting section 4, a parabolic mirror 5, a metallic base 7, and fins 8.

Each of the optical fibers 12 is a light-guiding member for guiding, to the light emitting section 4, excitation light emitted by a corresponding one of the laser elements 2. The optical fiber 12 includes an exit end part 12a whose position is fixed so that a laser beam emitted from the exit end part 12a is incident on an upper surface of the light emitting section 4 at an angle of 30°. In FIG. 20, the optical fibers 12 penetrate through a part of the parabolic mirror 5 which part is in the vicinity of the vertex of the parabolic mirror 5. Alternatively, the optical fibers 12 may be guided to the inside of the parabolic mirror 5 through an opening section provided in the metallic base 7.

The other parts of the configuration of Example 5 are identical to those of Example 1.

Because each of the optical fibers 12 has flexibility, it is possible to easily set an incident angle and an incident direction of the laser beam.

Example 6

FIG. 21 is a view schematically illustrating an illumination device 26 in accordance with still yet another example of the present invention. As shown in FIG. 21, the illumination device 26 includes a plurality of sets each including a laser element 2 and a condenser lens 11, a plurality of optical fibers 12, a magnifying lens 13, a reflecting mirror 14, a light emitting section 4, an elliptic mirror (reflecting mirror) 51, a metallic base 7, fins 8, and a rod lens 43.

A position of a window section 51a and a position and an angle of the reflecting mirror 14 are set so that a laser beam reflected by the reflecting mirror 14 is incident on an upper surface of the light emitting section 4 at an angle of 60° through the window section 51a.

A main difference between Examples 1 and 6 is as follows: Instead of the parabolic mirror, the illumination device 26 includes an elliptic mirror (elliptic spherical mirror) as its reflecting mirror. The light emitting section 4 is provided at a first focal point of the elliptic mirror 51. Fluorescence reflected by the elliptic mirror 51 is incident on an incident surface 43a, which is provided at one of ends of the rod lens 43. The fluorescence travels through the rod lens 43 and then exits from an exit surface 43b, which is the other of the ends of the rod lens 43. The incident surface 43a is positioned at a second focal point of the elliptic mirror 51.

The rod lens 43 functions as an optical indirector. The rod lens 43 mixes together angular components of the pencils of beams, so as to reduce non-uniformity in illumination intensity, color heterogeneity, and generation of flickering. The rod lens 43 may be shaped in a circular cylinder or a rectangular column. The shape of the rod lens 43 can be determined in accordance with a desired shape of a spot of the illumination light.

Such the configuration employing the rod lens 43 is suitable for a light source in an illumination system for a projector.

(Variations)

The present invention is not limited to the description of the embodiments above, but may be altered by a skilled person within the scope of the claims. An embodiment based on a proper combination of technical means disclosed in different embodiments is encompassed in the technical scope of the present invention.

A reflecting mirror included in a light emitting device of the present invention can be (i) a parabolic mirror having an opening section shaped in a closed ring or (ii) the one including a part of such a parabolic mirror. For example, as in a headlamp 27 shown in FIG. 22, light emitting sections 4 can be provided on respective top and back surfaces of a metal plate (heat conductive member, supporting member) 71. The metal plate 71 is provided so as to penetrate through a part of a parabolic mirror (reflecting mirror) 52 which part is in the vicinity of the vertex of the parabolic mirror 52 and to extend to the inside of the parabolic mirror 52. The metal plate 71 is a silver-plated copper plate. Each of the light emitting sections 4 is provided at a focal point of the parabolic mirror 52.

Laser beams emitted from laser elements 2 are formed into parallel light by respective lenses 18, and then reduced by a corresponding condenser lens 19 to a size which suits an upper surface of the corresponding light emitting section 4. Thereafter, the laser beams are reflected by the corresponding reflecting mirror 14, and are incident on the corresponding light emitting section 4 through a corresponding window section 52a of the parabolic mirror 52.

Each of the above-described embodiments and examples has dealt with the configuration in which the reflecting mirror is used as the light projecting section. However, the present invention is not limited to such configurations. Instead of the reflecting mirror, a lens can be used as the light projecting section. The present invention is applicable also to such a configuration.

FIG. 23 is a view schematically illustrating a configuration of a headlamp 31 including a projector lens as the light projecting section. As shown in FIG. 23, the headlamp 31 includes a light emitting section 34, a heat sink 35, and a projector lens (light projecting section) 36. The headlamp 31 also includes a laser element 2 (not illustrated).

The light emitting section 34 is made from the same material as that of the previously-described light emitting section 4. However, the light emitting section 34 is different from the light emitting section 4 in terms of a shape. For example, the light emitting section 34 has a shape having a long axis extending along a direction orthogonal to a light projection direction of the projector lens 36. Further, the light emitting section 34 has an upper surface 34a shaped in a rectangle. Furthermore, the upper surface 34a is irradiated with a laser beam which is emitted from the laser element 2 as an elliptic spot.

By designing, as described above, the shape of the light emitting section 34 so that the light emitting section 34 has the long axis which suits the shape of the spot of the laser beam emitted onto the light emitting section 34, it is possible to emit the laser beam efficiently. Furthermore, this configuration makes it possible to suitably emit illumination light forming a spot having a horizontal to vertical ratio satisfying light distribution property standards. For example, the shape of the light emitting section 34 can be determined so that the spot of the illumination light has a horizontal to vertical ratio of approximately 1:3 through 1:4.

The heat sink 35 supports the light emitting section 34, and has a function to dissipate, via a surface of the heat sink 35 which surface is in contact with the light emitting section 34, heat generated in the light emitting section 34 due to the laser beam emitted onto the light emitting section 34. For this purpose, the heat sink 35 is preferably made from a metal material through which heat is easily conducted, e.g., aluminum or copper. However, the material of the heat sink 35 is not particularly limited, and only needs to have high heat conductivity.

The surface of the heat sink 35 which surface is in contact with the light emitting section 34 has been subjected to a reflection treatment, and therefore functions as a reflecting surface. This allows the laser beam having entered the light emitting section 34 via the upper surface (main light emitting surface) 34a to be reflected by the reflecting surface, so that the laser beam is led to the inside of the light emitting section 34 again.

The projector lens 36 is a light projecting member for projecting, along a predetermined light projection direction, the fluorescence generated by the light emitting section 34. Namely, the projector lens 36 is an optical system which transmits and deflects the fluorescence, in order to project the fluorescence along the predetermined light projection direction.

As described above, the headlamp 31 uses the projector lens 36 as the light projecting member, in place of the parabolic mirror 5. With this configuration, it is possible to provide a small headlamp.

FIG. 24 is a view schematically illustrating a configuration of a headlamp 32 including a projector lens as the light projecting section. As shown in FIG. 24, the headlamp 32 includes a light emitting section 34, an elliptic mirror (light projecting section) 38, and a projector lens 36. The headlamp 32 also includes a laser element 2 (not illustrated).

A major difference between the headlamp 31 and the headlamp 32 is that the headlamp 32 includes the elliptic mirror 38 in addition to the projector lens 36, in order to accurately project the fluorescence emitted from the light emitting section 34.

The elliptic mirror 38 has a first focal point f1 and a second focal point f2. The light emitting section 34 is provided on the heat sink 35 so that a center of the light emitting section 34 is located at the first focal point f1.

According to the headlamp 32, the fluorescence emitted from the light emitting section 34, which is provided at the first focal point f1, is reflected by the elliptic mirror 38, and the fluorescence is led toward the second focal point f2. Thereafter, the fluorescence passes through the second focal point f2, and then is transmitted through the projector lens 36, so as to be projected within a predetermined angle range.

The use of both the projector lens 36 and the elliptic mirror 38 as described above makes it possible to project, with high accuracy, the fluorescence emitted from the light emitting section 34.

Also for each of the headlamps 31 and 32, an incident angle of the laser beam with respect to the upper surface 34a of the light emitting section 34 is important in view of use efficiency of the laser beam and the fluorescence.

As described previously, if the incident angle of the laser beam is not suitably set, a reflectance of the laser beam with respect to the upper surface 34a of the light emitting section 34 increases, so that a percentage of the laser beam which is to be converted into the fluorescence is reduced.

Further, how the incident angle of the laser beam is set affects the positional relationship between the light emitting section 34 and the projector lens 36. Therefore, also for the purpose of arranging the light emitting section 34 and the projector lens 36 in a preferably positional relationship, it is important to suitably set the incident angle of the laser beam.

Furthermore, it is preferable to suitably set the incident angle of the laser beam, for the purpose of emitting the laser beam onto the light emitting section 34 without providing an opening section in the elliptic mirror 38.

Embodiments of the present invention can also be expressed as below.

It is preferable that the incident angle is within a range of 30° or more but not more than 80° with respect to a line perpendicular to the upper surface.

In the case of a light emitting section configured as above, approximately half of the fluorescence is emitted within an angle range of less than 30° with respect to the line perpendicular to the upper surface. Therefore, if an opening section is provided in a part of the reflecting surface of the reflecting mirror which part is within the above angle range, there occurs a loss in the fluorescence because the excitation light cannot be reflected by the opening section. Furthermore, if the excitation light source is provided within the above angle range, there occurs a loss in the fluorescence because the fluorescence is absorbed or dispersed by the excitation light source.

Further, within an angle range of 80° or more but not more than 90°, use efficiency of the excitation light is reduced because the excitation light is likely to be reflected by the surface of the light emitting section.

Therefore, causing the excitation light to be incident on the upper surface of the light emitting section at an angle within a range of 30° or more but not more than 80° can increase use efficiency of the fluorescence.

Further, it is preferable that the incident angle is within a range of 40° or more but not more than 70° with respect to the line perpendicular to the upper surface.

Limiting the incident angle of the excitation light so that it falls within a range of 40° or more but not more than 70° can further reduce the effect given by providing the opening section in the reflecting mirror, thereby further reducing an amount of the excitation light reflected by the surface of the light emitting section. This makes it possible to further increase use efficiency of the fluorescence and the excitation light.

Further, it is preferable that the excitation light is P-polarized with respect to the upper surface.

P-polarized light has a low reflectance with respect to the upper surface of the light emitting section. Therefore, the above configuration makes it possible to increase use efficiency of the excitation light.

Further, it is preferable that the incident angle is within a range of 60° or more but not more than 65° with respect to the line perpendicular to the upper surface.

According to the above configuration, the incident angle corresponds to the Brewster's angle. With the Brewster's angle, it is possible to reduce the reflectance significantly, and it is therefore possible to increase use efficiency of the excitation light.

Further, it is preferable that the light emitting section has a thickness which is not more than one-tenth of a maximum width among widths of the light emitting section which widths are along a direction perpendicular to a thickness direction of the light emitting section.

Setting the thickness of the light emitting section to be not more than the above thickness eliminates the laterally-emitted fluorescence almost completely, thereby making it possible to further increase use efficiency of the fluorescence.

Further, it is preferable that the reflecting mirror includes at least a part of a partial curved surface obtained by (i) forming a curved surface by rotating a parabola around a rotational axis which is an axis of symmetry of the parabola, and by (ii) cutting the curved surface along a plane including the rotational axis.

According to the above configuration, the reflecting mirror includes the reflecting curved surface obtained by cutting the parabola along the plane including the rotational axis. Therefore, it is possible to provide, in a part corresponding to a remaining half of the parabola, a structure other than the parabola. Providing, as the structure, a plate having high heat conductivity and putting the plate in contact with the light emitting section makes it possible to efficiently dissipate heat of the light emitting section.

Furthermore, according to the above configuration, most of the fluorescence that cannot be controlled by the reflecting mirror is emitted toward the parabola. By taking advantage of this property, it is possible to moderately irradiate, with the fluorescence, a space on a side on which the parabola of the light emitting device is provided.

Further, it is preferable that the light emitting section is supported by a heat conductive member.

According to the above configuration, it is possible to cool the light emitting section by the heat conductive member, thereby making it possible to prevent a reduction in light-emitting efficiency of the light emitting section which reduction is caused by heat of the excitation light.

Further, it is preferable that the excitation light source is provided outside the reflecting mirror; and the reflecting mirror is provided with a window section through which the excitation light is transmitted or passed.

According to the above configuration, it is possible to emit, from the outside of the reflecting mirror, the excitation light onto the light emitting section through the window section provided in the reflecting mirror. This can increase flexibility in positioning of the excitation light source. For example, this makes it easy to suitably set an irradiation angle of the excitation light with respect to the excitation light irradiated surface of the light emitting section.

Further, it is preferable that the light emitting device includes a magnifying lens for enlarging a range of the light emitting section which range is irradiated with the excitation light.

The above configuration prevents a case where the light emitting section is locally irradiated with the excitation light, thereby making it possible to prevent deterioration of the light emitting section.

Further, it is preferable that the light emitting device includes a light-guiding section, provided so as to penetrate through the window section, for converging the excitation light emitted from the excitation light source and guiding the excitation light to the light emitting section.

According to the above configuration, it is possible to converge pencils of beams emitted from a plurality of excitation light sources or a plurality of pencils of beams emitted from a single excitation light source so as to emit them onto the light emitting section. This can substantially increase a power of the excitation light.

Further, it is preferable that the light emitting device includes an optical fiber for guiding, to the light emitting section, the excitation light emitted from the excitation light source.

According to the above configuration, it is possible to easily adjust the incident angle and an incident direction of the excitation light, because the optical fiber has flexibility.

Furthermore, a vehicle headlamp including the above light emitting device and an illumination device including the above light emitting device are also encompassed in the technical scope of the present invention.

Industrial Applicability

The present invention is applicable to light emitting devices and illumination devices, particularly to headlamps for automobiles. Further, with the present invention, these devices can increase use efficiency of fluorescence.

REFERENCE SIGNS LIST

1 Headlamp (light emitting device, vehicle headlamp)
2 Laser element (excitation light source)
4 Light emitting section
4a Upper surface
4c Spot
5 Parabolic mirror (reflecting mirror, light projecting section)
6 Window section
7 Metallic base (heat conductive member, supporting member)
8 Fins (cooling section)
10 Automobile (vehicle)
15 Fan (cooling section)
16 Water-cooling pipe (cooling section)
21 Headlamp (light emitting device, vehicle headlamp)
22 Headlamp (light emitting device, vehicle headlamp)
23 Headlamp (light emitting device, vehicle headlamp)
24 Headlamp (light emitting device, vehicle headlamp)
25 Headlamp (light emitting device, vehicle headlamp)
26 Illumination device (light emitting device)
27 Headlamp (light emitting device, vehicle headlamp)
31 Headlamp (light emitting device, vehicle headlamp)
32 Headlamp (light emitting device, vehicle headlamp)
34 Light emitting section
35 Heat sink (heat conductive member, supporting member)
36 Projector lens (light projecting section)
41 Array laser (excitation light source)
42 Light-guiding section
51 Elliptic mirror (reflecting mirror, light projecting section)
51a Window section
52 Parabolic mirror (reflecting mirror, light projecting section)
52a Window section
71 Metal plate (heat conductive member, supporting member)

The invention claimed is:

1. A light emitting device comprising:
an excitation light source for emitting excitation light;
a light emitting section for emitting fluorescence upon receiving the excitation light emitted from the excitation light source, the fluorescence being used as illumination light; and
a light projecting section for projecting the fluorescence emitted by the light emitting section,
a part of the light projecting section being provided above an excitation light irradiated surface of the light emitting section, the excitation light irradiated surface being an upper surface of the light emitting section, and the upper surface having a larger area than a side surface of the light emitting section,
the excitation light irradiated surface of the light emitting section being a flat surface and receiving the excitation light and emitting most of the fluorescence,
the light emitting section having a thickness that is not more than one-tenth of a maximum width among widths of the light emitting section, the widths being measured in a direction perpendicular to a thickness direction of the light emitting section, and
the excitation light source being positioned off set from an optical axis of the light projection section and producing an incident angle of the excitation light with respect to the excitation light irradiated surface from 30° to 80°, the angle being measured from a direction perpendicular to the excitation light irradiated surface.

2. The light emitting device as set forth in claim 1, wherein:
the incident angle is within a range of 40° or more but not more than 70° with respect to the direction perpendicular to the excitation light irradiated surface.

3. The light emitting device as set forth in claim 1, wherein:
the excitation light is a P-polarized laser beam with respect to the excitation light irradiated surface.

4. The light emitting device as set forth in claim 3, wherein:
the incident angle is within a range of 60° or more but not more than 65° with respect to a line perpendicular to the excitation light irradiated surface.

5. The light emitting device as set forth in claim 1, wherein:
the light projecting section includes a reflecting mirror; and
the reflecting mirror includes at least a part of a partial curved surface obtained by (i) forming a curved surface by rotating a parabola around a rotational axis which is an axis of symmetry of the parabola, and by (ii) cutting the curved surface along a plane including the rotational axis.

6. The light emitting device as set forth in claim 1, wherein:
the light emitting section is supported by a heat conductive member.

7. The light emitting device as set forth in claim 1, wherein:
the excitation light source is provided outside the light projecting section; and
the light projecting section is provided with a window section through which the excitation light is transmitted or passed.

8. The light emitting device as set forth in claim 1, further comprising:
a magnifying lens for enlarging a range of the light emitting section which range is irradiated with the excitation light.

9. The light emitting device as set forth in claim 7, further comprising:
a light-guiding section, provided so as to penetrate through the window section, for converging the excitation light emitted from the excitation light source and guiding the excitation light to the light emitting section.

10. The light emitting device as set forth in claim 1, further comprising:
an optical fiber for guiding, to the light emitting section, the excitation light emitted from the excitation light source.

11. A vehicle headlamp comprising a light emitting device recited in claim 1.

12. An illumination device comprising a light emitting device recited in claim 1.

13. A light emitting device comprising:
an excitation light source for emitting excitation light;
a light emitting section for emitting fluorescence upon receiving the excitation light emitted from the excitation light source, the fluorescence being used as illumination light; and
a light projecting section for projecting the fluorescence emitted by the light emitting section,
a part of the light projecting section being provided above an excitation light irradiated surface of the light emitting section, the excitation light irradiated surface being an upper surface of the light emitting section, and the upper surface having a larger area than a side surface of the light emitting section,
the excitation light irradiated surface of the light emitting section being a flat surface and receiving the excitation light and emitting most of the fluorescence,
a spot of the excitation light incident on the excitation light irradiated surface having an area that is smaller than an area of the excitation light irradiated surface, and
the excitation light source being positioned off set from an optical axis of the light projection section and producing an incident angle of the excitation light with respect to the excitation light irradiated surface from 30° to 80°, the angle being measured from a direction perpendicular to the excitation light irradiated surface.

14. The light emitting device as set forth in claim 13, wherein:
the incident angle is within a range of 40° or more but not more than 70° with respect to the direction perpendicular to the excitation light irradiated surface.

* * * * *